(12) United States Patent
Tominaga et al.

(10) Patent No.: US 6,768,418 B2
(45) Date of Patent: Jul. 27, 2004

(54) TIRE AIR PRESSURE DETECTION DEVICE FOR DETECTING AIR PRESSURE BASED ON VEHICLE SPEED SIGNAL

(75) Inventors: Motonori Tominaga, Anjo (JP); Toshiharu Naito, Okazaki (JP); Takeyasu Taguchi, Nagoya (JP); Masaaki Tabata, Chiryu (JP); Hideki Ohashi, Chiryu (JP); Yukio Mori, Nagoya (JP)

(73) Assignees: Denso Corporation, Kariya (JP); Toyota Jidosha Kabushiki Kaisha, Aichi-ken (JP)

( * ) Notice: Subject to any disclaimer, the term of this patent is extended or adjusted under 35 U.S.C. 154(b) by 95 days.

(21) Appl. No.: 10/264,282

(22) Filed: Oct. 4, 2002

(65) Prior Publication Data

US 2003/0076223 A1 Apr. 24, 2003

Related U.S. Application Data

(63) Continuation of application No. PCT/JP02/00957, filed on Feb. 6, 2002.

(30) Foreign Application Priority Data

| Feb. 8, 2001 | (JP) | ......................................... | 2001-032477 |
| Feb. 8, 2001 | (JP) | ......................................... | 2001-032478 |
| Feb. 8, 2001 | (JP) | ......................................... | 2001-032482 |

(51) Int. Cl.[7] ............................................. B60C 23/00

(52) U.S. Cl. ........................ 340/444; 340/442; 340/443; 340/671; 340/672; 73/146; 73/146.2

(58) Field of Search .............................. 340/444, 442, 340/443, 671, 672; 73/146, 146.2; 701/36, 45, 47

(56) References Cited

U.S. PATENT DOCUMENTS

| 5,895,846 | A | | 4/1999 | Chamussy et al. |
| 5,939,626 | A | | 8/1999 | Tominaga et al. |
| 5,982,279 | A | | 11/1999 | Tominaga et al. |
| 6,137,400 | A | * | 10/2000 | Yanase et al. ............... 340/442 |
| 6,182,001 | B1 | * | 1/2001 | Sugai et al. ................... 701/78 |

FOREIGN PATENT DOCUMENTS

| JP | A-7-125512 | 5/1995 |
| JP | A-9-104209 | 4/1997 |
| JP | A-9-203678 | 8/1997 |
| JP | A-9-207528 | 8/1997 |
| JP | A-10-76823 | 9/1997 |
| JP | A-9-240226 | 9/1997 |
| JP | A-9-249010 | 9/1997 |
| JP | A-10-6725 | 1/1998 |
| JP | A-10-100623 | 4/1998 |
| JP | A-10-100624 | 4/1998 |
| JP | A-10-129222 | 5/1998 |
| JP | A-10-175411 | 6/1998 |
| JP | A-10-193933 | 7/1998 |
| JP | A-10-258617 | 9/1998 |
| JP | A-11-5417 | 1/1999 |

* cited by examiner

*Primary Examiner*—Daryl Pope
(74) *Attorney, Agent, or Firm*—Posz & Bethards, PLC

(57) ABSTRACT

A tire air pressure detection device of the present invention includes a warning anticipation timing calculating portion for anticipating a warning timing at which tire air pressure decrease detecting portion will detect the tire air pressure decrease based on rotational status value compensated for by a rotational status value compensating portion. A tire air pressure decrease detecting portion detects a decrease in tire air pressure when a clocked determination time reaches the warning anticipation timing anticipated by the warning anticipation timing calculating portion.

18 Claims, 23 Drawing Sheets

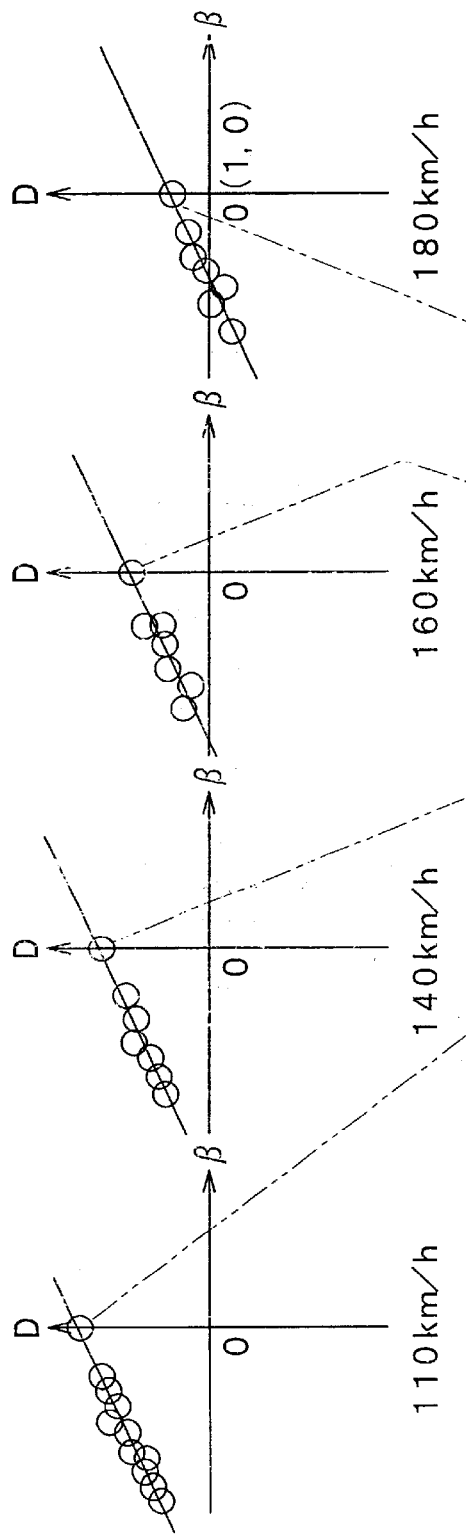
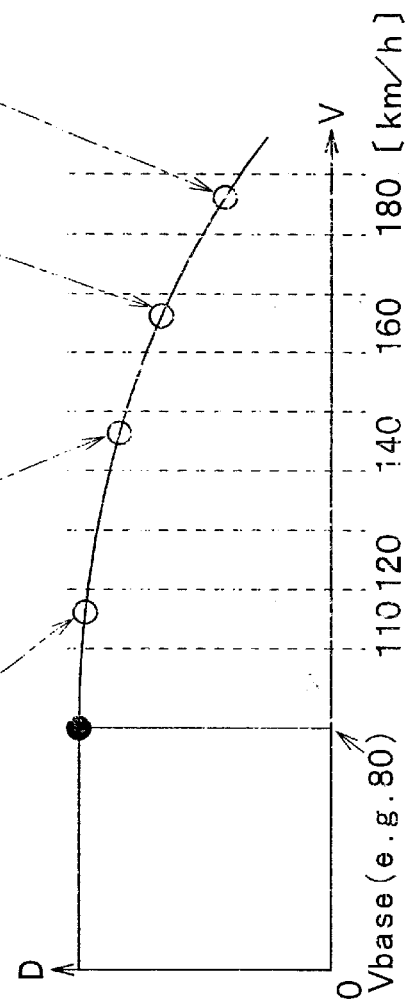
FIG.21A
FIG.21B

TIRE AIR PRESSURE DETECTION DEVICE FOR DETECTING AIR PRESSURE BASED ON VEHICLE SPEED SIGNAL

CROSS REFERENCE TO RELATED APPLICATION

This application is a continuation of PCT Application No. PCT/JP02/00957 filed on Feb. 6, 2002, the contents of which are incorporated herein by reference.

FIELD OF THE INVENTION

The present invention relates to a device for detecting tire air pressure based on a vehicle speed signal.

DESCRIPTION OF THE RELATED ART

JP-A-H7-125512 discloses a conventional tire air pressure detection device. The tire air pressure device can detect an accurate tire air pressure by removing the effect of tread-lift. Tread-lift is a phenomenon wherein a dynamic rolling radius of a tire in which tire air pressure has decreased becomes approximately the same as that of a tire in which tire air pressure has not decreased because the radius of tire increases due to a centrifugal force.

When the dynamic rolling radius of the tire increases due to the effect of tread-lift, a determination value for determining tire air pressure decrease is erroneously determined because the dynamic rolling radius of the tire in which tire air pressure has decreased becomes approximately the same as that of a tire of which tire air pressure has not decreased. That is, the determination value for determining tire air pressure decrease varies to close that of a determination value of the tire of which tire air pressure has not decreased. As a result, tire air pressure is not detected accurately.

Accordingly, in JP-A-H7-125512, an air pressure detection device checks a relationship between vehicle speed correlating with the centrifugal force and a determination value for determining the tire air pressure (e.g., a rotational status value), and stores the relationship in memory. Thus, the determination value is compensated for with respect to vehicle speed based on the stored relationship, and therefore tire air pressure is detected accurately.

However, a degree of the effect of the tread-lift also varies with respect to the tire air pressure. For example, a relationship between the tire air pressure and the effect of the tread-lift is shown in FIG. 22. As tire air pressure decreases, the dynamic rolling radius due to the effect of tread-lift also increases. Incidentally, the dynamic rolling radius $\Delta R$ is expressed in, for example, $\Delta R = 10^{(-1.97-1.31)} \times V^{(0.735p-1.147)}$, where tire air pressure is $P(kfg/cm^2)$ and a vehicle speed is $V(km/h)$.

Therefore, although the effect of tread-lift is not generated when tire air pressures of four wheels are identical, it is generated when one of the tire air pressures of the four wheels significantly decreases. As a result, if the determination value is compensated for as mentioned above when the tire air pressures of four wheels are identical, non-uniformity of the determination value increases.

JP-A-H10-100624 also discloses a conventional tire air pressure detection device. The tire air pressure device detects a decrease in tire air pressure based on wheel speed variation D and a front and rear wheel speed ratio $\beta$. The wheel speed variation D and the front and rear wheel speed ratio $\beta$ are expressed as follows, where $V_{FR}$ corresponds to front right wheel speed, $V_{FL}$ corresponds to front left wheel speed, $V_{RR}$ corresponds to rear right wheel speed and $V_{RL}$ corresponds to rear left wheel speed.

$$D = \frac{V_{FR}}{V_{FL}} - \frac{V_{RR}}{V_{RL}} \quad (1)$$

$$\beta = \frac{V_{FR} + V_{FL}}{V_{RR} + V_{RL}} \quad (2)$$

The wheel speed variation D represents a rotational status value calculated based on wheel speeds of four vehicle wheels. For example, the wheel speed variation D is a variable defined as a difference of wheel speed ratios of each pair of wheels located diagonally from each other, and increases or decreases when the tire air pressures of some of the vehicle wheels decrease. The front and rear wheel speed ratio $\beta$ is a tire slip status value that denotes a degree of slip status of driven wheels caused by transmitted driving forces. For example, the smaller the front and rear wheel speed ratio $\beta$ is, the higher the slip of one (or both) of the driven wheels is.

The wheel speed variation D increases or decreases when the tire air pressures of some of the vehicle wheels decreases below a standard value, and it is zero when each tire air pressure of each tire equals the standard value. Therefore, the tire pressure decrease is detected based on the wheel speed variation D.

However, regarding, for example, a rear wheel drive vehicle, when the tire air pressure of the rear right wheel corresponding to one of the driven wheels decreases below the standard value, the other driven wheel tends to slip easier than the rear right wheel because a ground contact area of the rear right wheel increases and resistance force for suppressing the slip increases even if the diameter of the rear right wheel decreases due to the tire air pressure decrease. Accordingly, the wheel speed variation D varies based on the degree of slip status of the wheels.

Thus, as shown in FIG. 23, a regression line is calculated based on a relationship of the front and rear wheel speed ratio $\beta$ and the wheel speed variation D using a minimum square calculation methodology. An ideal value of the wheel speed variation D is then calculated by compensating for the wheel speed variation D (or an average $D_{AVE}$). An ideal value of the wheel speed variation D is a value of the wheel speed variation D if the slip does not occur when the front and rear wheel speed ratio $\beta$ is 1. Thus, the effect of the slip of the driven wheels is removed, and therefore the tire air pressure decrease can accurately be detected.

However, the wheel speed variation D varies based on the effect of the tread-lift as well as the slip of the driven wheels. Referring to FIG. 24, a calculation result of the wheel speed variation D is plotted using white circles (○) separately from black circles (●) that indicates a wheel speed variation D when the effect of the tread-lift is not generated. Therefore, the accuracy of the calculation of the wheel speed variation D decreases, and therefore the warning pressure varies.

Further, if vehicle speed is high during the tire air pressure is decreasing, an accurate wheel speed variation D may not be obtained and therefore the tire air pressure decrease cannot be detected accurately.

For example, in the above-mentioned related device (JP-A-H10-100624), the wheel speed variation D under an ideal driven status is calculated based on the regression line. A difference (±D'sh) between the wheel speed variation D under the ideal driven status and a predetermined reference value ($D'_{AVE}$std) is defined as a determination value for determining the tire air pressure decrease. Then, the tire air pressure decrease is determined when the determination value exceeds a warning threshold. In this case, as shown in FIG. 25, the higher the vehicle speed is, the smaller the determination value is. That is, it is difficult to determine the tire air pressure decrease because the determination value is small. As a result, the tire air pressure decrease cannot be detected accurately.

SUMMARY OF THE INVENTION

It is therefore an object of the present invention to provide a tire air pressure detection device that is capable of obviating the above problems.

It is another object of the present invention to provide the tire air pressure detection device that is capable of increasing the accuracy of the rotational status value even if an effect of tread-lift is generated.

It is another object of the present invention to provide the tire air pressure detection device that is capable of obviating warning pressure non-uniformity.

A tire air pressure detection device of the present invention includes a warning anticipation timing calculating portion for anticipating a warning timing at which the tire air pressure decrease detecting portion will detect the tire air pressure decrease based on the rotational status value compensated for by a rotational status value compensating portion. A tire air pressure decrease detecting portion detects a decrease in tire air pressure when a clocked determination time reaches the warning anticipation timing anticipated by the warning anticipation timing calculating portion.

Accordingly, the driver is warned of the tire air pressure decrease when the clocked determination time reaches the warning anticipation timing regardless of the rotational status value compensated for by a rotational status value compensating portion. Therefore, even if the vehicle speed is high while the tire air pressure is decreasing and the rotational status value varies, the tire air pressure detection device can detect a decrease in tire air pressure when a determination reaches the warning anticipation timing.

A tire air pressure detection device of the present invention has a tread-lift compensation processing portion ($3j$) for determining whether a determination value exceeds a predetermined threshold (Cth) and for compensating for the determination value when the determination value exceeds the predetermined threshold. The tire air pressure decrease detecting portion detects a decrease in tire air pressure based on the determination value calculated by the tread-lift compensation processing portion.

The determination value is appropriately compensated for when the effect of tread-lift is large, and thus an appropriate determination value can be calculated. Therefore, the tire air pressure can be accurately detected.

A tire air pressure detection device of the present invention has a tread-lift compensation processing portion ($3j$) for removing an effect of tread-lift and adjusting a degree of the compensation of the determination value.

Accordingly, a degree of compensation of the determination value is adjusted with respect to an offset amount of the determination value. Therefore, the compensation degree increases when the effect of tread-lift is large, and decreases when the effect of tread-lift is small. As a result, an appropriate determination value can be calculated, and the tire air pressure can be accurately detected.

In a tire air pressure detection device of the present invention, the compensation methodology is executed after an initializing mode at which a post-compensation rotational status value is not yet calculated by a rotational status value calculating portion.

Accordingly, the determination value is not compensated for while a reference value is calculated when respective tire air pressures of respective vehicle wheels are identical. Therefore, initializing mode processing is appropriately executed.

A tire air pressure detection device of the present invention includes a first rotational status value compensation portion ($3n$) for compensating for the rotational status value calculated by the rotational status value calculating portion with respect to a vehicle speed as a parameter.

Accordingly, the rotational status value in which the effect of tread-lift is removed is calculated by compensating for rotational data within short intervals using vehicle speed as a parameter. As a result, it is possible to compensate for the slippage effect of the driven wheels based on the rotational status value, and to detect the tire air pressure decrease accurately.

In a tire air pressure detection device of the present invention, a regression line calculating portion ($3d$) is for classifying vehicle speed to several speed ranges, distinguishing the rotational status value and the slip status value in each related speed range of the several speed ranges, and calculating a regression line that is a linear function expressing a relationship between the rotational status value calculated by the rotational status value calculating portion and the slip status value calculated by the slip status value calculating portion at each of the several speed ranges. A rotational status value compensating portion ($3f$) is for compensating for the rotational status value calculated by the rotational status value calculating portion based on the regression line calculated at each speed range by the regression line calculating portion. A tire air pressure decrease detecting portion ($3h$) is for calculating a regression curve based on the rotational status value of each speed range compensated for by the rotational status value compensating portion, and for detecting a tire air pressure decrease based on a determination value ($\Delta D''_{AVE}$) that is defined based on the rotational status value at the each speed range compensated for by the rotational status value compensating portion.

According to the tire air pressure detection device of the present invention, the effect of tread-lift is removed after the effect of slip is removed. As a result, it is possible to detect the tire air pressure decrease accurately.

BRIEF DESCRIPTION OF THE DRAWINGS

Other objects, features and advantages of the present invention will be understood more fully from the following detailed description made with reference to the accompanying drawings in which:

FIGS. 21A and 21B show relationships between a slip variation A and a post-compression wheel speed variation $D'_{AVE}$ in each speed range according to a sixth embodiment;

DETAILED DESCRIPTION OF THE PREFERRED EMBODIMENT

Figure 1:
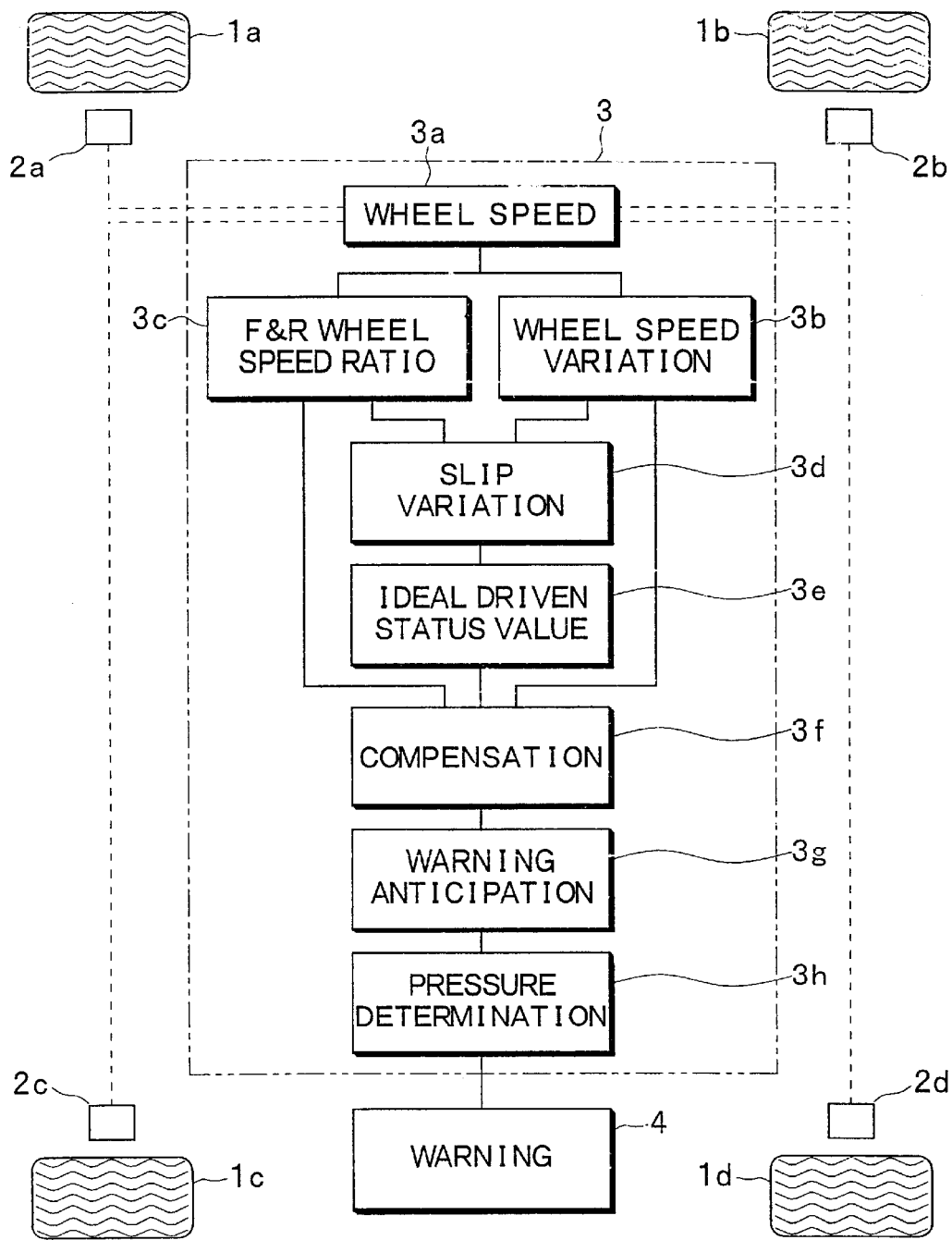
FIG. 1 is a schematic view showing a tire air pressure detection device according to a first embodiment of the present invention.

The present invention will be described further with reference to various embodiments shown in the drawings.

(First embodiment)

Referring to FIG. 1, a tire air pressure detection device is for detecting a decrease in tire air pressure of one or more of the vehicle wheels and for warning a driver. The tire air pressure detection device is applicable to both front or rear wheel drive vehicles. However, in the present embodiment, the tire air pressure device will be described with reference to a rear wheel drive vehicle.

The tire air pressure detection device includes vehicle wheel speed sensors 2a, 2b, 2c and 2d, which are located around respective vehicle wheels 1a, 1b, 1c and 1d, a central processing unit (CPU) 3 and a warning device 4. The CPU 3 receives input signals from the vehicle wheel speed sensors 2a–2d and determines whether tire air pressure in one or more of the vehicle wheels 1a–1d decreases to output a warning signal to the warning device 4. Incidentally, the vehicle speed sensors 2a–2d correspond to vehicle speed detecting portions.

The vehicle wheel speed sensors 2a, 2b respectively detect and output wheel speed signals of respective non-driven wheels (i.e., left and right front wheels). The vehicle wheel speed sensors 2c, 2d detect and output wheel speed signals of respective driven wheels (i.e., left and right rear wheels).

The CPU 3 is a microcomputer or the like for calculating respective values based on detected signals from the vehicle wheel speed sensors 2a–2d and is constructed as follows.

The CPU 3 includes a vehicle wheel speed calculation portion 3a and a vehicle wheel speed variation processing portion 3b. The vehicle wheel speed calculation portion 3a calculates respective vehicle wheel speeds of respective wheels 1a–1d based on detected signals (e.g., pulse signals) from the vehicle wheel speed sensors 2a–2d. The vehicle wheel speed variation processing portion 3b includes a vehicle speed variation calculating portion corresponding to a rotation status value calculating portion, a first vehicle speed variation memorizing portion, and a vehicle speed variation average processing portion. Results calculated by the vehicle wheel speed variation processing portion 3b are used for calculating a relative vehicle speed variation D.

The wheel speed calculating portion 3a calculates the respective vehicle wheel speeds of the respective wheels 1a–1d based on detected signals from the vehicle wheel speed sensors 2a–2d. For example, respective vehicle wheel speeds $V_{FL}$, $V_{FR}$, $V_{RL}$ and $V_{RR}$ are calculated based on signals from the vehicle wheel speed sensors 2a–2d inputted over several seconds. The vehicle wheel speed variation calculating portion then calculates a wheel speed variation D using the above-mentioned equation (1) based on data corresponding to calculated vehicle wheel speeds. The resultant data of the wheel speed variation D is stored in a memory included in the first wheel speed variation memorizing portion. Also, the wheel speed variation average processing portion calculates an average value $D_{AVE}$ of the wheel speed variation D based on the resultant data of the wheel speed variation D. The average value $D_{AVE}$ of the wheel speed variation D corresponds to the average of $n_0$ portions of the wheel speed variation D expressed as the following equation.

$$D_{AVE} = \frac{1}{n_0} \Sigma D(N) \tag{3}$$

The CPU 3 includes a front and rear wheel speed ratio processing portion 3c. The front and rear wheel speed ratio processing portion 3c includes a front and rear wheel speed ratio calculating portion corresponding to a slip status value calculating portion, a front and rear wheel speed ratio memorizing portion, and a front and rear wheel speed ratio average processing portion. In the front and rear wheel speed ratio processing portion 3c, the front and rear wheel speed ratio calculating portion calculates a front and rear wheel speed ratio β using the above-mentioned equation (2) based on data from the wheel speed calculating portion 3a. The resultant data of the front and rear wheel speed ratio β is stored in a memory included in the front and rear wheel speed ratio memorizing portion. Also, the front and rear wheel speed ratio average processing portion calculates the average value $\beta_{AVE}$ of the front and rear wheel speed ratio β based on the resultant data of the front and rear wheel speed ratio β. The average value $\beta_{AVE}$ of the front and rear wheel speed ratio β corresponds to the average of $n_0$ portions of the front and rear wheel speed ratio β expressed in the following equation.

$$\beta_{AVE} = \frac{1}{n_0}\Sigma\beta(N) \quad (4)$$

The CPU 3 also includes a slip variation calculating portion 3d, an ideal driving status value calculating portion 3e, and a wheel speed variation compensating processing portion 3f.

The slip variation calculation portion 3d calculates slip variation A based on the wheel speed variation D calculated by the wheel speed variation calculating portion of the wheel speed variation processing portion 3b, and the front and rear wheel speed ratio β calculated by the front and rear wheel speed ratio calculating portion of the front and rear wheel speed ratio processing portion 3c. The slip variation A corresponds to the change in value (ΔD/Δβ) of the wheel speed variation D with respect to the front and rear wheel speed ratio β and is calculated by a minimum square calculation methodology using $n_0$ portions of the wheel speed variation D and the front and rear wheel speed ratio β. The slip variation calculating portion 3d corresponds to a regression line calculating portion.

The ideal driving status value calculating portion 3e calculates an ideal driving status value βid based on calculation results of the slip variation calculating portion 3d. The ideal driving status value βid corresponds to the front and rear wheel speed ratio β when the vehicle is driven with no tire slippage, is used as a standard compensation value, and is calculated as a linear function, quadratic function or the like of the slip variation A. That is, the ideal driving status value βid is expressed by βid=F (A). For example, if the ideal driving status value kid equals a linear function of the slip variation A, it is expressed by βid=1−Coef×|A|, where Coef is constant.

The wheel speed variation compensating processing portion 3f includes a wheel speed variation compensating portion and a second wheel speed variation memorizing portion. The wheel speed variation compensating portion corresponds to a rotational status value compensating portion. The wheel speed variation compensating portion calculates a post compensation wheel speed variation $D'_{AVE}$ based on the average value $D_{AVE}$ of the wheel speed variation D for each wheel, the average value $\beta_{AVE}$ of the front and rear wheel speed ratio β, the slip variation A, and the ideal driving status value βid. The post-compensation wheel speed variation $D'_{AVE}$ corresponds to a wheel speed variation D for ideal driving status. Specifically, the post-compensation wheel speed variation $D'_{AVE}$ is calculated based on the following equation.

$$D'_{AVE}=D_{AVE}+A(\beta id-\beta_{AVE}) \quad (5)$$

The second wheel speed variation memorizing portion selects and stores a reference value $D'_{AVE}$std based on the post-compensation wheel speed variation $D'_{AVE}$. The reference value $D'_{AVE}$std corresponds to post-compensation wheel speed variation $D'_{AVE}$ when tire air pressures of four wheels are identical to be used for a reference value in determining tire air pressure decrease. The reference value $D'_{AVE}$std is calculated based on the average value $D_{AVE}$ of the wheel speed variation. D for each wheel, the average value $\beta_{AVE}$ of the front and rear wheel speed ratio β, the slip variation A, and the ideal driving status value βid calculated based on the wheel speed variation D and the front and rear wheel speed ratio β calculated immediately after the CPU 3 starts.

The CPU 3 further includes a warning anticipation timing calculating portion 3g and a tire air pressure decrease determination portion 3h. The warning anticipation timing calculating portion 3g calculates a warning anticipation timing based on the reference value $D'_{AVE}$std stored in the second wheel speed variation memorizing portion and the post-compensation wheel speed variation $D'_{AVE}$ calculated by the wheel speed variation compensating portion, and stores the warning anticipation timing data. Specifically, tire air pressure decrease ratio is calculated based on a change of the post-compensation wheel speed variation $D'_{AVE}$. A timing of which the post-compensation wheel speed variation $D'_{AVE}$ exceeds a predetermined warning threshold is then anticipated based on the tire air pressure decrease ratio and is stored as the warning anticipation timing.

The tire air pressure decrease determination portion 3h determines whether a clocked determination time reaches the warning anticipation timing to determine the tire air pressure decrease. Specifically, when the clocked determination time reaches the warning anticipation timing, the tire air pressure decrease determination portion 3h transmits a warning signal denoting a tire air pressure decrease to the warning device 4.

The warning device 4 warns the driver of the tire air pressure decrease by causing a warning light equipped in a vehicle passenger compartment to blink when the warning signal is transmitted thereto.

Figure 2:
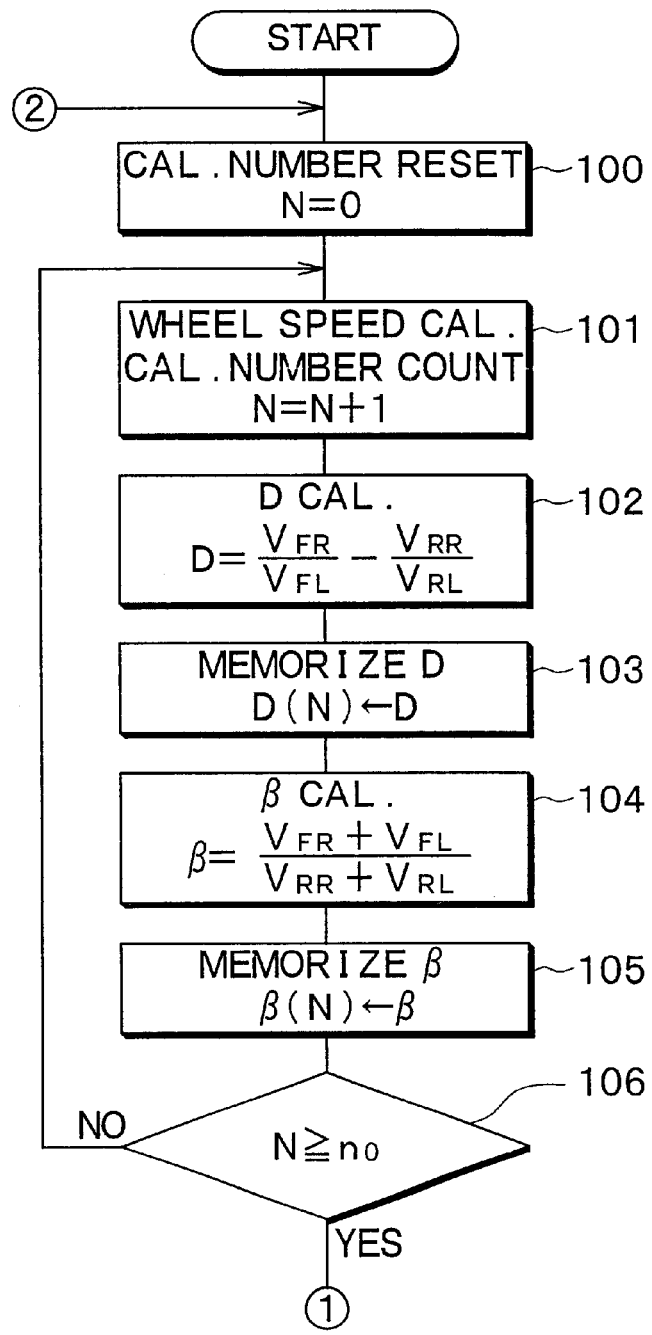
FIG. 2 is a flow diagram showing tire air pressure detecting processing according to the first embodiment.
Figure 3:
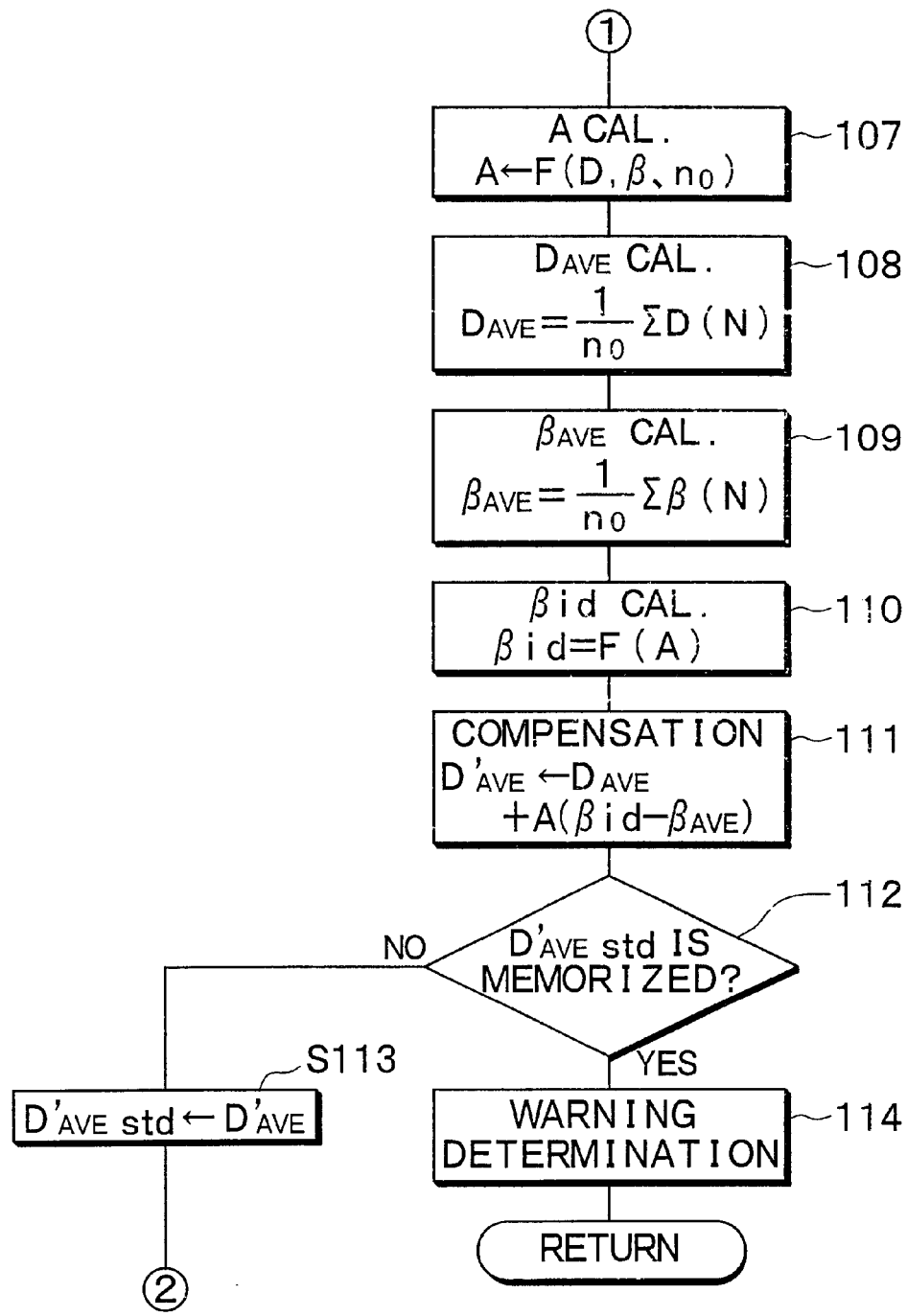
FIG. 3 is the flow diagram showing tire air pressure detecting processing following FIG. 2.
Figure 4:
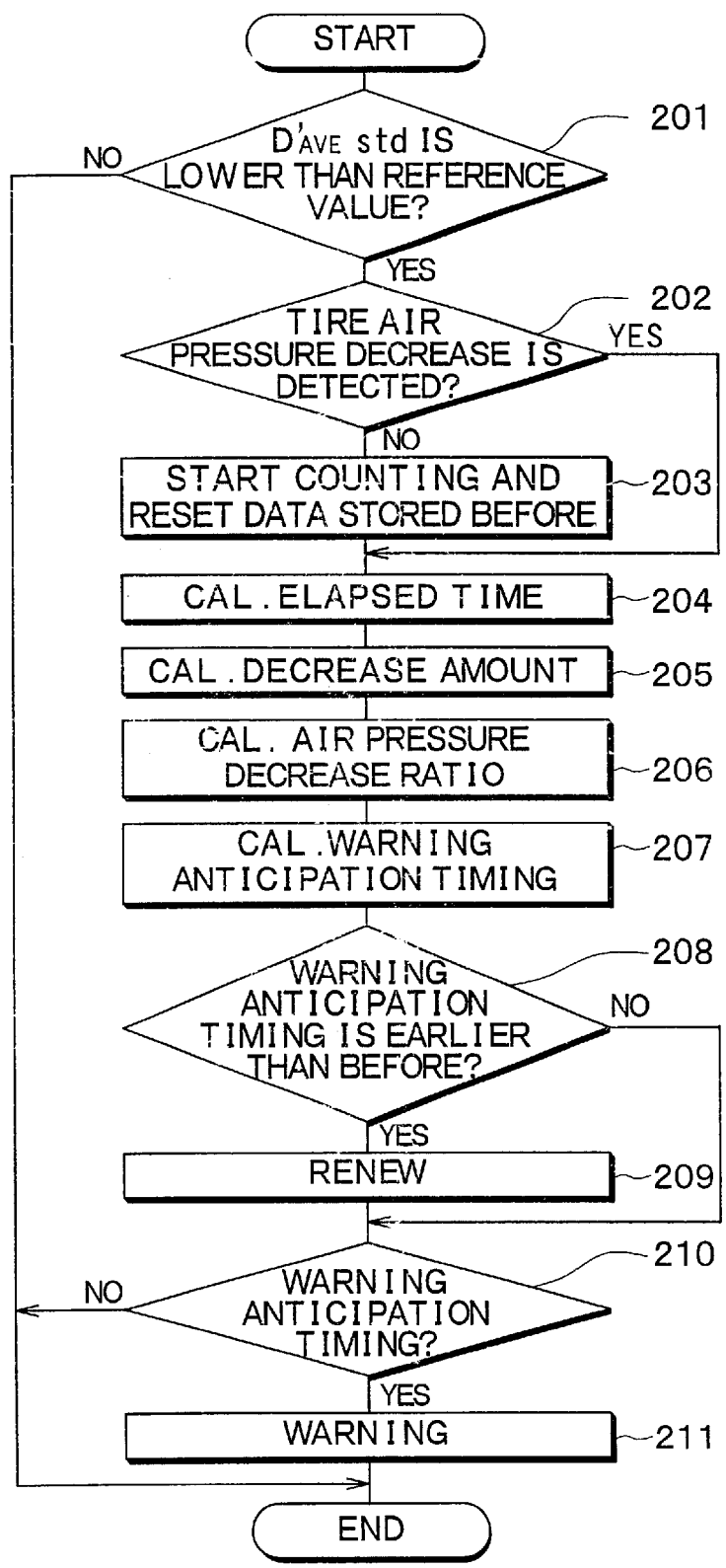
FIG. 4 is a flow diagram showing warning determination processing shown in FIG. 3.

Details of tire air pressure determination processing will now be described with reference to FIGS. 2–4. FIGS. 2 and 3 are flow diagrams showing tire air pressure detecting processing. FIG. 4 is a flow diagram showing warning determination processing.

At 100, a wheel speed calculation number N is reset (N=0). At 101, during wheel speed calculating processing based on the detected signals from the wheel speed sensors 2a–2d, the wheel speed calculating portion 3a calculates respective vehicle wheel speeds $V_{FL}$, $V_{FR}$, $V_{RL}$ and $V_{RR}$. The CPU 3 then increases the wheel speed calculation number N. The processing calculates respective wheel speed averages of each wheel every several minutes based on wheel speed pulses during the several minutes.

At 102, during wheel speed variation calculating processing, the wheel speed variation calculating portion of the vehicle wheel speed processing portion 3b calculates the wheel speed variation D. The wheel speed variation D is calculated by substituting the respective vehicle wheel speeds $V_{FL}$, $V_{FR}$, $V_{RL}$ and $V_{RR}$ calculated at 101 into the equation (1).

At 103, the first wheel speed variation memorizing portion stores the wheel speed variation D calculated at 102 to add memorized wheel speed variations D(N). Incidentally, D(N) corresponds to an arrangement of $n_0$ memorized portions of the wheel speed variation D stored in a position of the memory corresponding to a wheel speed calculation number. The first wheel speed variation memorizing portion re-stores a new wheel speed variation D in the position of the memory corresponding to wheel speed calculation number N when, for example, the wheel speed calculation number N is reset at 100 after the $n_0$ portions of the wheel speed variation D are stored.

At 104, during front and rear wheel speed ratio calculating processing, the front wheel speed ratio calculating portion of the front wheel speed ratio processing portion 3c calculates a front and rear wheel speed ratio β. The front and rear wheel speed ratio β is also calculated by substituting the respective vehicle wheel speeds $V_{FL}$, $V_{FR}$, $V_{RL}$ and $V_{RR}$ calculated at 101 into the equation (2). At 105, the memory of the front and rear wheel speed ratio memorizing portion stores the front and rear wheel speed ratio β calculated at 104 to add memorized front and rear wheel speed ratios β (N). Incidentally, β (N) corresponds to an arrangement of $n_0$ memorized portions of the front and rear wheel speed ratio β stored in a position of the memory corresponding to a wheel speed calculation number. The front and rear wheel speed ratio memorizing portion re-stores a new front and rear wheel speed ratio β in the position of the memory corresponding to wheel speed calculation number N as well as the D(N) after the $n_0$ portions of the front and rear wheel speed ratio β are stored.

At 106, the CPU 3 determines whether the wheel speed calculation number N is larger than $n_0$. The processing advances to 107 when a determination at 106 is positive because $n_0$ portions of the wheel speed variation D and the front and rear wheel speed ratio β are stored, while returning at 101 when the determination at 106 is negative.

At 107, during slip variation calculating processing, the slip calculating portion 3d calculates a slip variation A. That is, a regression line corresponding to linear function of the wheel speed variation D and the front and rear wheel speed ratio β is calculated, and therefore the slip variation A is calculated based on the regression line. The slip variation A expresses a degree of dependency of the wheel speed variation D with respect to the front and rear wheel speed ratio β.

At 108, during wheel speed variation averaging processing, the wheel speed variation averaging portion of the wheel speed variation processing portion 3b calculates an average value $D_{AVE}$ of the wheel speed variation D. The average value $D_{AVE}$ of the wheel speed variation D is calculated by substituting respective wheel speed variations D memorized at 103 into equation (3).

At 109, during front and rear wheel speed ratio averaging processing, the front and rear wheel speed ratio averaging processing portion of the front and rear wheel speed ratio processing portion 3c calculates an average value $\beta_{AVE}$ of the front and rear wheel speed ratio β stored in the memory. The average of the front and rear wheel speed ratio β is calculated by substituting respective front and rear wheel speed ratio β memorized at 105 into equation (4).

At 110, during ideal driving status value calculating processing, the ideal driving status value calculating portion 3e calculates an ideal driving status value βid. The ideal driving status value βid is calculated based on the linear function, quadratic function or the like of the slip variation A calculated at 110.

At 111, during wheel speed variation compensating processing, the wheel speed variation compensating portion of the wheel speed variation compensating processing portion 3f calculates a post-compensation wheel speed variation $D'_{AVE}$ by substituting the average value $D_{AVE}$, the average value $\beta_{AVE}$, the slip variation A, and the ideal driving status value βid calculated at 107–110 respectively into equation (5).

Figure 5:
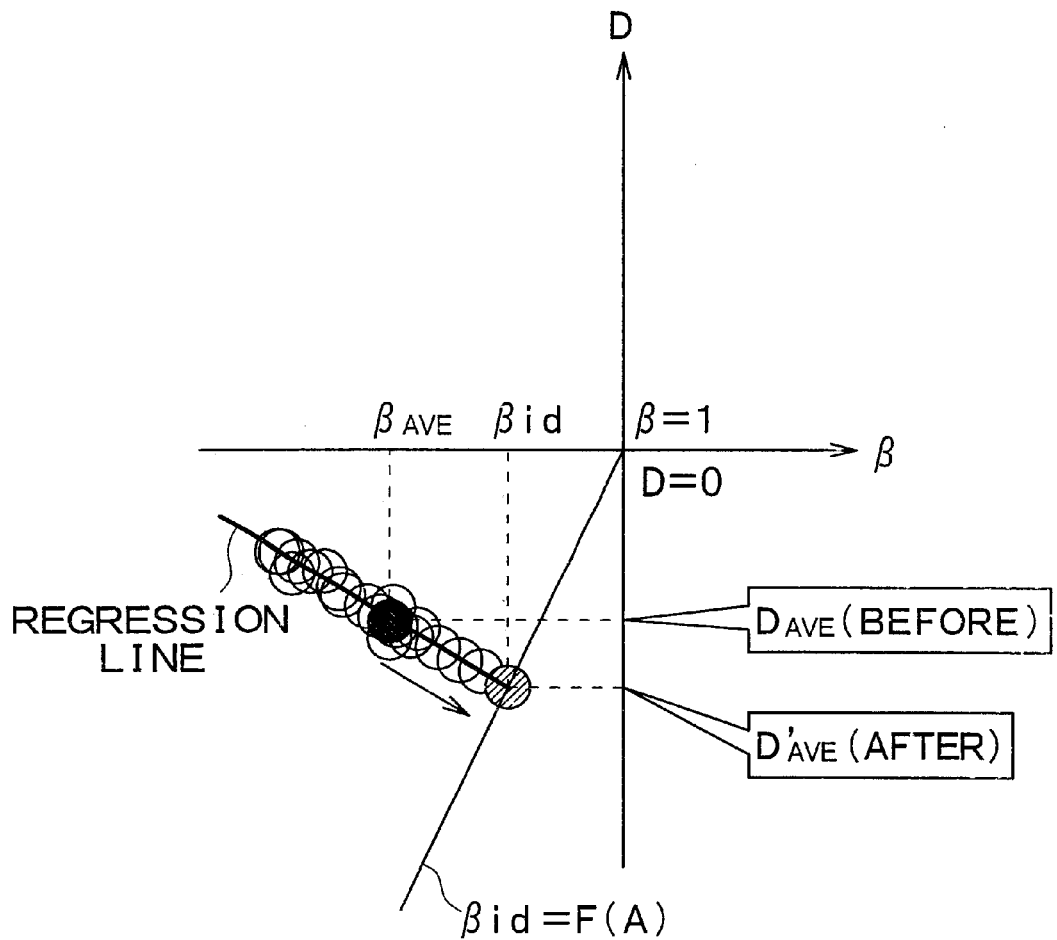
FIG. 5 shows a relationship between an average $D_{AVE}$ wheel speed variation D before compensation and a wheel speed variation average after compensation (hereinafter referred to as a post-compensation wheel speed variation $D'_{AVE}$) according to the first embodiment.

A relationship between the post-compensation wheel speed variation $D'_{AVE}$ and each value (the value $D_{AVE}$, the slip variation A, the ideal driven status value βid, and the average value $\beta_{AVE}$) for calculating the post-compensation wheel speed variation $D'_{AVE}$ is shown in FIG. 5.

FIG. 5 shows a relationship between the wheel speed variation D and the front and rear wheel speed ratio β when tire air pressure of one of the driven wheels 1c, 1d (e.g., the left rear wheel) decreases. In FIG. 5, white circles (○) indicate $n_0$ portions of the relationship between the wheel speed variation D and the front and rear wheel speed ratio β, and black circles (●) indicate a relationship between the average value $D_{AVE}$ of the wheel speed variation D and the average value $\beta_{AVE}$ of the front and rear wheel speed ratio β.

If the tire air pressure of the left rear wheel that is one of the driven wheels 1c, 1d decreases, the vehicle wheel speed $V_{RL}$ of the left rear wheel increases. Therefore, the front and rear wheel speed ratio D decreases below 1 according to the tire air pressure decrease. Since an ideal driving status value βid satisfies the equation βid=F(A) when there is no tire slippage, it is therefore calculated based on the slip variation A and the equation of βid=F(A) as at 110.

Further, as shown at 107, a regression line corresponding to a linear function of no portions of the wheel speed variation D and the front and rear wheel speed ratio β is calculated using a minimum square calculation methodology.

Accordingly, as shown at 111, upon calculating an intersection point of regression line and the equation βid=F (A), a post-compensation wheel speed variation $D'_{AVE}$, which corresponds to a wheel speed variation D under ideal driving status when tire air pressure of at least one of the driven wheels 1c, 1d decreases, is calculated. Thus, the post-compensation wheel speed variation $D'_{AVE}$ can be appropriately calculated without excessive compensation.

At 112, the CPU 3 determines whether the reference value $D'_{AVE}$std has already been determined. The processing determines whether the reference value $D'_{AVE}$std is stored in the memory of the second wheel speed variation memorizing portion of the wheel speed variation compensating processing portion 3f. If the post-compensation wheel speed variation $D'_{AVE}$ is calculated initially after the CPU 3 starts, the processing advances to 113 to store the post-compensation wheel speed variation $D'_{AVE}$ as a reference value $D'_{AVE}$std and then returns to 100. Further, the warning threshold is defined based on the reference value $D'_{AVE}$std. For example, a value separating predetermined value D' sh from the reference value $D'_{AVE}$std is defined as the warning threshold. On the other hand, if the reference value $D'_{AVE}$std has already been stored, the processing advances to 114.

At 114, warning determining processing is executed by the warning anticipation timing calculating portion 3g and the tire air pressure decrease determination portion 3h.

Referring to FIG. 4, at 201, the CPU 3 determines whether the post-compensation wheel speed variation $D'_{AVE}$ is lower than the reference value $D'_{AVE}$std. The processing advances to end when a determination at 201 is negative because the tire air pressure does not decrease. The processing advances to 202 when the determination at 201 is positive.

At 202, the CPU 3 determines whether a tire air pressure decrease is detected. This is determined based on a count of a counter (not shown) included in the warning anticipation timing calculating portion 3g. For example, a tire air pressure decrease is not detected when the count is 0.

When a determination at 202 is negative, the processing advances to 203 to start counting by the counter and to reset the data stored before as the warning anticipation timing. Specifically, an infinite timing is set as the warning anticipation timing. The processing then advances to 204. When a determination at 202 is positive, the processing advances to 204 because the counting has already been started and the warning anticipation timing has been set.

At 204, an elapsed time T from when the detection of tire air pressure decrease starts is calculated. At 205, a decrease amount of the post-compensation wheel speed variation $D'_{AVE}$ from when detection starts is calculated. At 206, tire air pressure decrease ratio per predetermined time interval ($\Delta D'AVE/\Delta T$) is calculated based on the elapsed time T and decrease amount of the post-compensation wheel speed variation $D'_{AVE}$. The processing then advances to 207, and a warning anticipation timing at which the post-compensation wheel speed variation $D'_{AVE}$ is lower than the warning threshold is calculated based on the tire air pressure decrease ratio per predetermined time interval.

At 208, the CPU 3 determines whether the warning anticipation timing calculated at 207 is earlier than that stored before in the tire air pressure decrease determination portion 3h. The processing advances to 209 when a determination at 208 is positive to replace data of the warning anticipation timing stored in the tire air pressure decrease determination portion 3h with the newly calculated data. The processing then advances to 210.

To the contrary, the processing advances to 210 when the determination is negative. In the tire air pressure detection device of the present embodiment, the data is only renewed when an earlier timing is calculated as the warning anticipation timing, although the warning anticipation timing may alternatively be renewed every time. This is because an earlier driver warning is preferred.

At 210, the CPU 3 determines whether the clocked determination time reaches the warning anticipation timing. The processing advances to 211 when a determination at 210 is positive. Therefore, the tire air pressure decrease determination portion 3h transmits a warning signal denoting tire air pressure decrease to the warning device 4. The processing advances to end when a determination is negative. Thus, a tire air pressure decrease of respective wheels 1a–1d can be detected.

Figure 6A:
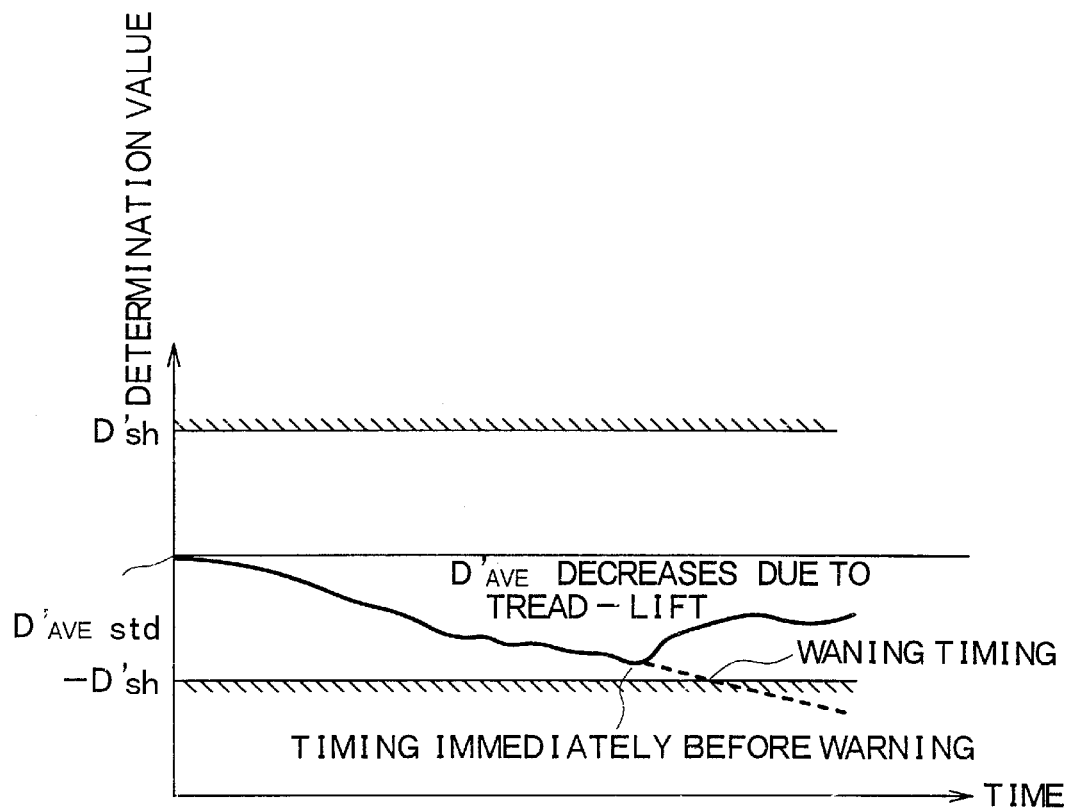
FIG. 6A is a timing diagram of the post-compensation wheel speed variation $D'_{AVE}$ according to the first embodiment.
Figure 6B:
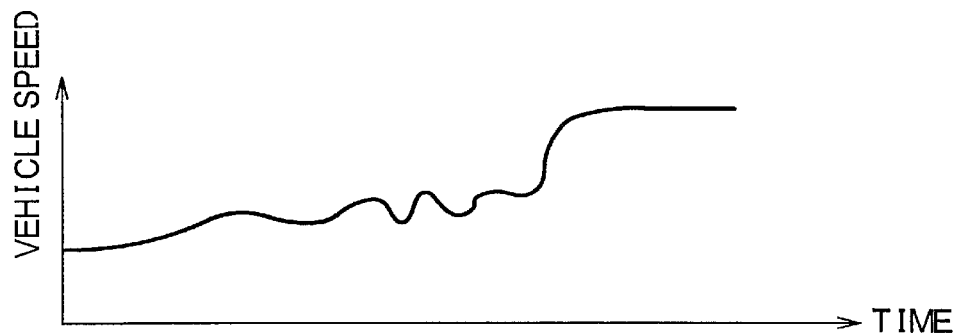
FIG. 6B is a timing diagram of a vehicle speed according to the first embodiment.

According to the tire air pressure detection device of the present embodiment, referring to FIGS. 6A and 6B, a warning anticipation timing at which a post-compensation wheel speed variation $D'_{AVE}$ is lower than a warning threshold is calculated based on tire air pressure decrease ratio per predetermined time ($\Delta D'AVE/\Delta T$). Then, the driver is warned of the tire air pressure decrease when the clocked determination time reaches the warning anticipation timing even if the post-compensation wheel speed variation $D'_{AVE}$ is actually lower than the warning threshold.

Therefore, even if vehicle speed is high while the tire air pressure is decreasing and the post-compensation wheel speed variation $D'_{AVE}$ closes to the reference value $D'_{AVE}$std indicating that tire air pressure does not decrease as shown in FIGS. 6A and 6B, the tire air pressure detection device can detect tire air pressure decrease when the clocked determination time reaches the warning anticipation timing (i.e., an intersection of dotted line and threshold).

In the tire air pressure detection device of the present embodiment, data of the warning anticipation timing is only renewed when it will renew earlier timing data. Accordingly, the tire air pressure detection device can warn the driver of a tire air pressure decrease at the earliest possible time.

Incidentally, in JP-A-H10-100624, the ideal wheel speed variation value D is calculated under the condition that the front and rear wheel speed ratio β is 1. However, the front and rear wheel speed ratio β is not 1 when tire air pressure decrease. Therefore, the above compensation is excessive. In this case, changes of the wheel speed variation D of the driven wheels and non-driven wheels due to the tire air pressure decrease are different, and a warning pressure, which is a pressure at which a drivers is warned, varies.

To the contrary, according to the tire air pressure detection device of the present embodiment, the slip variation A is calculated based on a wheel speed variation D and a front and rear wheel speed ratio β. An ideal driving status value βid is then calculated based on the slip variation A. Also, a post-compensation wheel speed variation $D'_{AVE}$ is calculated based on an average Value $D_{AVE}$ of the wheel speed variation D of each wheel, an average value $β_{AVE}$ of the front and rear wheel speed ratio β, the slip variation A, and the ideal driving status value βid.

Therefore, the post-compensation wheel speed variation $D'_{AVE}$, which corresponds to a wheel speed variation D under an ideal driving status when the tire air pressure of at least one of the driven wheels 1c, 1d decreases, is calculated without excessive compensation. As a result, the post-compensation wheel speed variation $D'_{AVE}$ when the tire air pressure of the driven wheel decreases and that when the tire air pressure of the non-driven wheel decreases are identical. Therefore, regardless of which wheels decrease in pressure, the warning pressure remains uniform.

(Second embodiment)

Figure 7:
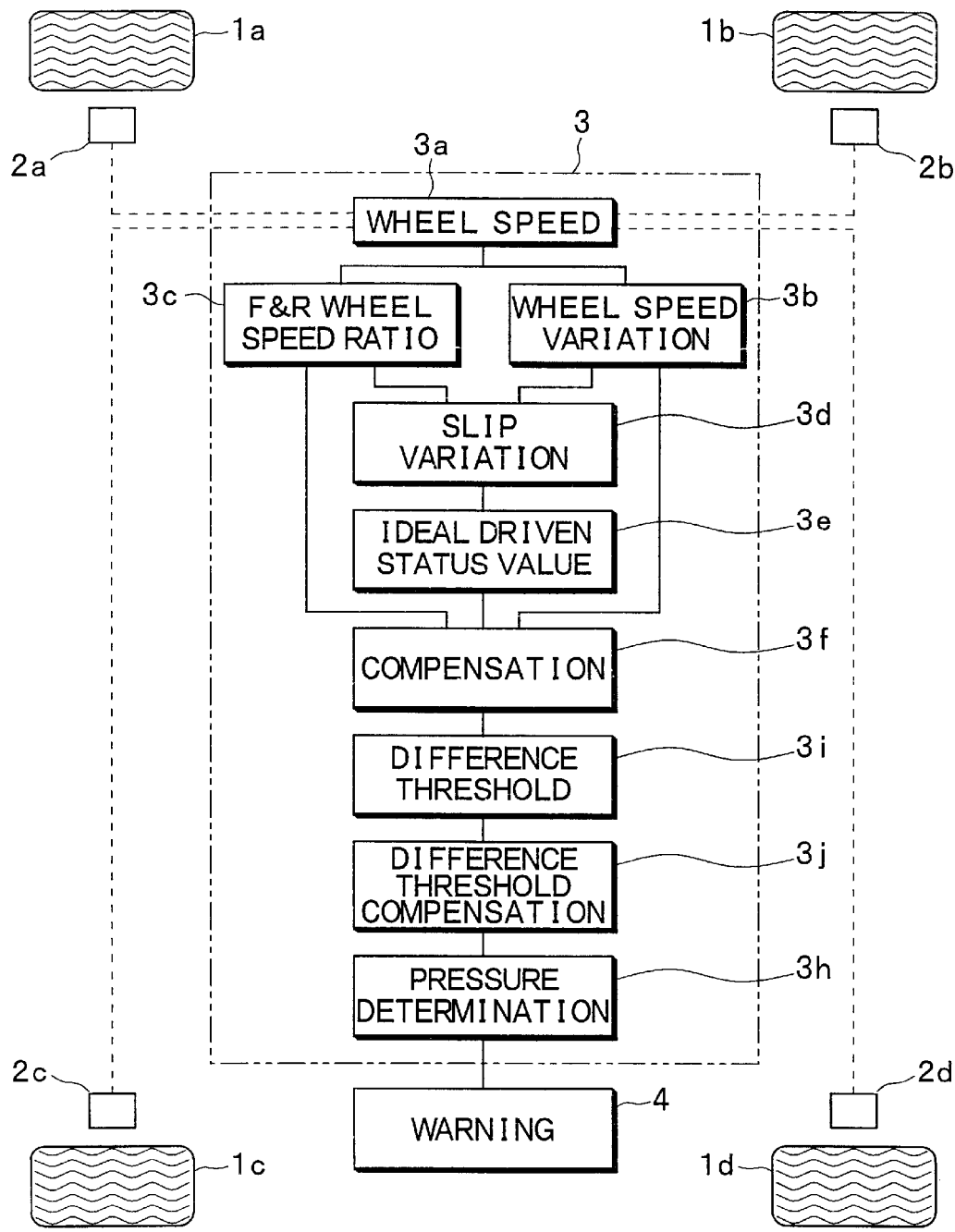
FIG. 7 is a schematic view showing a tire air pressure detection device according to a second embodiment of the present invention.

In a second embodiment of the present invention shown in FIG. 7, a tire air pressure detection device has a different construction from the first embodiment. As shown in FIG. 7, in this embodiment, the tire air pressure detection device is modified with respect to tire air pressure detection device in the first embodiment.

In the tire air pressure detection device, a CPU 3 has a pressure difference threshold calculating portion 3i and a difference threshold compensating portion 3j.

The pressure difference threshold calculating portion 3g calculates a pressure difference determination value $\Delta D'_{AVE}$ based on the reference value $D'_{AVE}$std stored in the second wheel speed variation memorizing portion of the wheel speed variation compensating processing portion 3f and the post-compensation wheel speed variation $D'_{AVE}$ calculated by the wheel speed variation compensating portion. The pressure difference determination value $\Delta D'_{AVE}$ equals a difference between the reference value $D'_{AVE}$std and the post-compensation wheel speed variation $D'_{AVE}$ ($\Delta D'_{AVE}$= $D'_{AVE}$std–$D'_{AVE}$) and is used for evaluating the tire air pressure decrease.

The pressure difference threshold compensating portion 3j compensates for the pressure difference determination value $\Delta D'_{AVE}$ calculated at the pressure difference threshold calculating portion 3g. This compensation is basically determined in the same manner as in JP-A-H7-125512, and is described as follows.

The compensation is executed using an equation expressing a relationship between a square value ($V^2$) of the vehicle speed V and the pressure difference determination value $\Delta D'_{AVE}$. The relational equation is defined as follows.

The vehicle speed V is calculated based on vehicle wheel speeds calculated by a vehicle wheel speed calculating portion 3a. For example, the vehicle speed V corresponds a wheel speed average $V_{AVE}$ of vehicle wheel speeds $V_{FL}$, $V_{FR}$, $V_{RL}$ and $V_{RR}$. The average wheel speed average $V_{AVE}$ is applied for a value that equals to a summation of the vehicle wheel speeds $V_{FL}$, $V_{FR}$, $V_{RL}$ and $V_{RR}$ divided by 4 (total wheel number). The average wheel speed average $V_{AVE}$ may alternative be applied for a value that equals to a summation of three of the vehicle wheel speeds $V_{FL}$, $V_{FR}$, $V_{RL}$ and $V_{RR}$ divided by 3. This is because one of the vehicle wheel speeds $V_{FL}$, $V_{FR}$, $V_{RL}$ and $V_{RR}$ may be higher than the others due to the tire air pressure decrease.

A relationship between the vehicle speed V and the pressure difference determination value $\Delta D'_{AVE}$ is experimentally measured. That is, a change of the pressure difference determination value $\Delta D'_{AVE}$ with respect to vehicle speed V is measured after the tire air pressure of one of the four wheels decreases below a standard pressure (e.g., 30% decrease). For example, under the above-mentioned condition, the vehicle is driven at a predetermined speed, and the pressure difference determination value $\Delta D'_{AVE}$ is repeatedly measured. This experimental measurement is practiced at each speed range classified from an available speed range as a vehicle speed. For example, the available speed range from 20 km/h to 180 km/h is classified to 10 km/h range. Thereafter, each average value of the pressure difference determination value $\Delta D'_{AVE}$ of each classified range is calculated. By executing the experimental measurement for all respective tires, each pressure difference determination value $\Delta D'_{AVE}$ of each tire with respect to vehicle speed V is determined.

Further, one of the speed ranges (e.g., 120 km/h range) classified as mentioned above is defined as a reference speed $V_0$. Then, a graph is defined. A horizontal axis of the graph is defined as a square value X $(=(v/v_0)^2)$ of a ratio of the vehicle speed V to the reference speed $V_0$. A longitudinal axis of the graph is defined as a ratio Y of the each average value of the pressure difference determination value $\Delta D'_{AVE}$ to an average value of the pressure difference determination value $\Delta D'_{AVE}$ of the reference speed $V_0$.

After the graph is completed, by calculating the regression line using minimum square calculation methodology, the regression line is a downward-sloping straight line. Therefore, a relationship between the ratio X and the ratio Y is expressed by equation Y=−aX+b, where 'a' and 'b' are constants. The equation expressing the relationship between ratio X and the ratio Y is stored in memory. Thus, a relationship of the pressure difference determination value $\Delta D'_{AVE}$ to the square value ($V^2$) of the vehicle speed V is defined.

Next, a pressure difference determination value $\Delta D''_{AVE}$ after compensation (hereinafter referred to as a post-compensation pressure difference determination value $\Delta D''_{AVE}$) is calculated by compensating for the pressure difference determination value $\Delta D'_{AVE}$ calculated by the pressure difference threshold calculating portion 3i during real driving based on the equation expressing the relationship between ratio X and the ratio Y. Specifically, compensation processing is executed as in equation (6), where r(V) corresponds to an inverse of the ratio Y.

$$\Delta D''_{AVE} = \Delta D'_{AVE} \times r(V) \qquad (6)$$

Thus, the compensation processing of the pressure difference determination value $\Delta D'_{AVE}$ without the effect of tread-lift is completed. Incidentally, the compensation processing is executed when the pressure difference determination value $\Delta D'_{AVE}$ exceeds a predetermined threshold Cth, but when it is lower than the predetermined threshold Cth (see 123 in FIG. 9).

The tire air pressure decrease determination portion 3h compares an absolute value $|\Delta D''_{AVE}|$ of the post-compensation pressure difference determination value $\Delta D''_{AVE}$ to a predetermined threshold value D" sh to determine the tire air pressure decrease. Specifically, when the absolute value $|\Delta D''_{AVE}|$ is higher than the predetermined threshold value D" sh, the tire air pressure decrease determination portion 3h transmits a warning signal denoting tire air pressure decrease to the warning device 4.

Details of tire air pressure determination processing will now be described with reference to FIGS. 8 and 9.

At 100 through 112, processing as in the first embodiment is executed. Then, at 112, the processing advances to 121 when the post-compensation wheel speed variation $D'_{AVE}$ is not calculated when the CPU 3 starts.

At 121, during pressure difference threshold calculating processing, the pressure difference threshold calculating portion 3i calculates a pressure difference determination value $\Delta D'_{AVE}$ that corresponds to a difference between the reference value $D'_{AVE}$std and the post-compensation wheel speed variation $D'_{AVE}$.

At 122, the tire air pressure decrease determination portion 3h determines whether an absolute value $|\Delta D'_{AVE}|$ of the pressure difference determination value $\Delta D'_{AVE}$ is larger than the predetermined threshold value Dsh. The tire air pressure hardly decreases and the effect of the tread-lift is relatively small when the pressure difference determination value $\Delta D'_{AVE}$ is not relatively large. In this case, non-uniformity of the pressure difference determination value $\Delta D'_{AVE}$ increases if the compensation processing without the effect of tread-lift is executed. Accordingly, the processing advances to 123 to execute the compensation processing without the effect of tread-lift when a determination at 122 is positive, while returning at 100 when the determination at 122 is negative.

At 123, during compensation processing without the effect of tread-lift, the difference threshold compensating portion 3j compensates for the pressure difference determination value $\Delta D'_{AVE}$. That is, the pressure difference determination value $\Delta D'_{AVE}$ is compensated for by equation (6) defined based on the relationship of the pressure difference determination value $\Delta D'_{AVE}$ to the square value ($V^2$) of the vehicle speed V. Thus, the post-compensation pressure difference determination value $\Delta D''_{AVE}$ is calculated.

At 124, the tire air pressure decrease determination portion 3h determines whether the absolute value $|\Delta D''_{AVE}|$ of the post-compensation pressure difference determination value $\Delta D''_{AVE}$ is larger than the predetermined threshold value D" sh. The processing advances to 125 to transmit the warning signal to the warning device 4 when a determination at 124 is positive. The processing advances to end and returns at 100 when the determination is negative. In this manner, any tire air pressure decreases in the respective vehicle wheels 1a −1d are detected.

Figure 10:
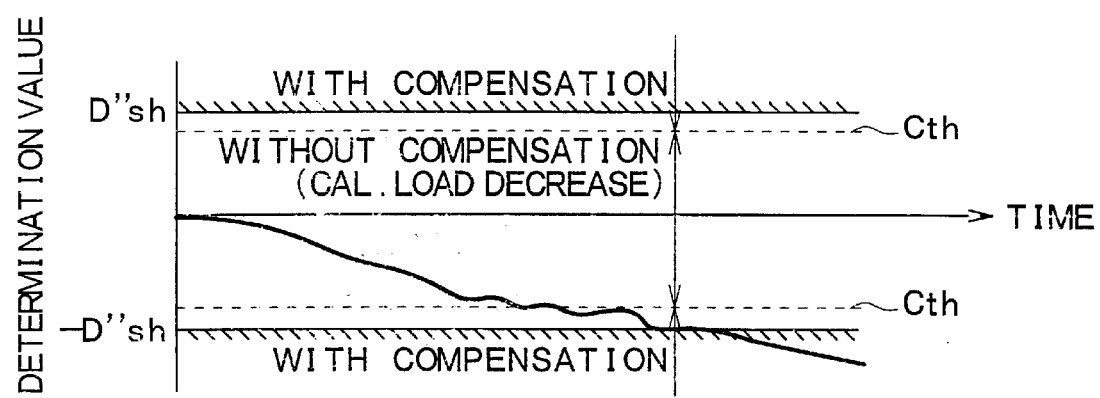
FIG. 10 is a timing diagram of the difference determination value $\Delta D'_{AVE}$ according to the second embodiment.

Upon executing the above-mentioned processing, a timing diagram of the pressure difference determination value $\Delta D'_{AVE}$ is illustrated in FIG. 10. As shown in FIG. 10, according to the tire air pressure detection device of the present embodiment, the compensation processing is executed when the pressure difference determination value $\Delta D'_{AVE}$ exceeds a predetermined threshold Cth, but when it is lower than the predetermined threshold Cth. That is, the compensation processing is executed only when the effect of tread-lift is not negligible. Therefore, an increase in the non-uniformity of the pressure difference determination value $\Delta D'_{AVE}$ when the compensation processing without the effect of tread-lift is executed can be avoided even if the effect of tread-lift is not large.

To the contrary, the pressure difference determination value $\Delta D'_{AVE}$ is appropriately compensated for when the effect of tread-lift is large. Thus, an appropriate pressure difference determination value can be calculated even if the dynamic rolling radius of the tire increases due to the effect of tread-lift. Therefore, the post-compensation wheel speed variation $D'_{AVE}$ does not close to the reference value $D'_{AVE}$std, and the tire air pressure can be accurately detected.

Incidentally, the compensation processing without the effect of tread-lift is not executed until the reference value $D'_{AVE}$std is stored, i.e., until the initializing mode. Thus, the pressure difference determination value $\Delta D'_{AVE}$ is not compensated for while the references value $D'_{AVE}$std is calculated when respective tire air pressure of respective vehicle wheels $1a$–$1d$ are identical. Therefore, initializing mode processing is appropriately executed.

(Third embodiment)

In a third embodiment, a pressure difference determination value is compensated for in a manner different from the second embodiment. Incidentally, the configuration of the tire air pressure detection device of the third embodiment is the same as in the second embodiment, but processing executed in a difference threshold compensating portion $3j$ is different from the second embodiment.

In the tire air pressure detection device of the present embodiment, the difference threshold compensating portion $3j$ calculates an equation expressing a relationship between a square value ($V^2$) of the vehicle speed V and a pressure difference determination value $\Delta D'_{AVE}$ in the same manner as in the second embodiment. The equation is then stored in memory.

The pressure difference determination value $\Delta D'_{AVE}$ calculated by the pressure difference threshold calculating portion $3i$ during driving is compensated for based on the equation. In this case, entire pressure difference determination value $\Delta D'_{AVE}$ is compensated for even if the pressure difference determination value $\Delta D'_{AVE}$ does not exceed a predetermined threshold Cth. This processing is different from the second embodiment.

In this processing, a degree of compensation of the pressure difference determination value $\Delta D'_{AVE}$ is adjusted with respect to an offset amount of the pressure difference determination value $\Delta D'_{AVE}$. That is, the larger the offset amount of the pressure difference determination value $\Delta D'_{AVE}$ is, the larger the compensation degree is. For example, when the compensation processing of the pressure difference determination value $\Delta D'_{AVE}$ is defined by equation (6) as in the second embodiment, a value expressing in equation from ((the offset amount of the pressure difference determination value $\Delta D'_{AVE}$/predetermined threshold Cth)× 100%) is further multiplied by a post-compensation pressure difference determination value $\Delta D'_{AVE}$. This is expressed in the following equation.

$$\Delta D''_{AVE} = \Delta D'_{AVE} \times \{r(V) \times F(\Delta D'_{AVE})\} \quad (7)$$

Next, details of tire air pressure determination processing will now be described with reference to FIG. 11. Since the tire air pressure determination processing is almost the same as in the second embodiment, portions identical to those in FIG. 8 are omitted.

Figure 8:
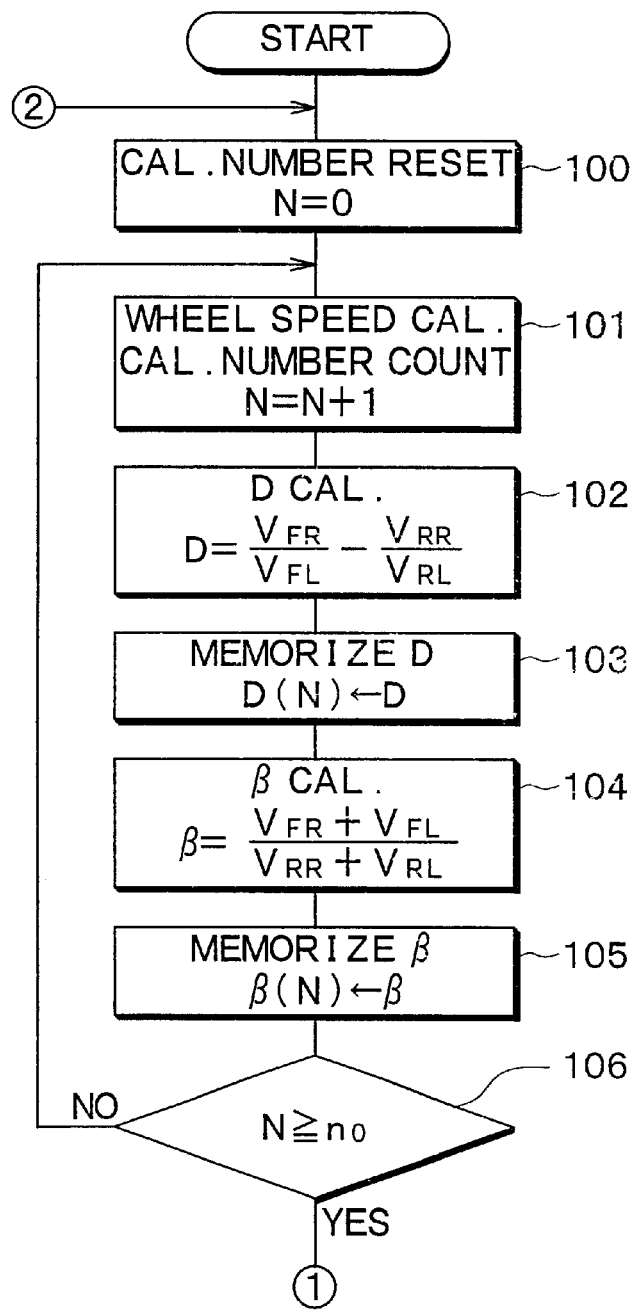
FIG. 8 is a flow diagram showing tire air pressure detecting processing according to the second embodiment.
Figure 9:
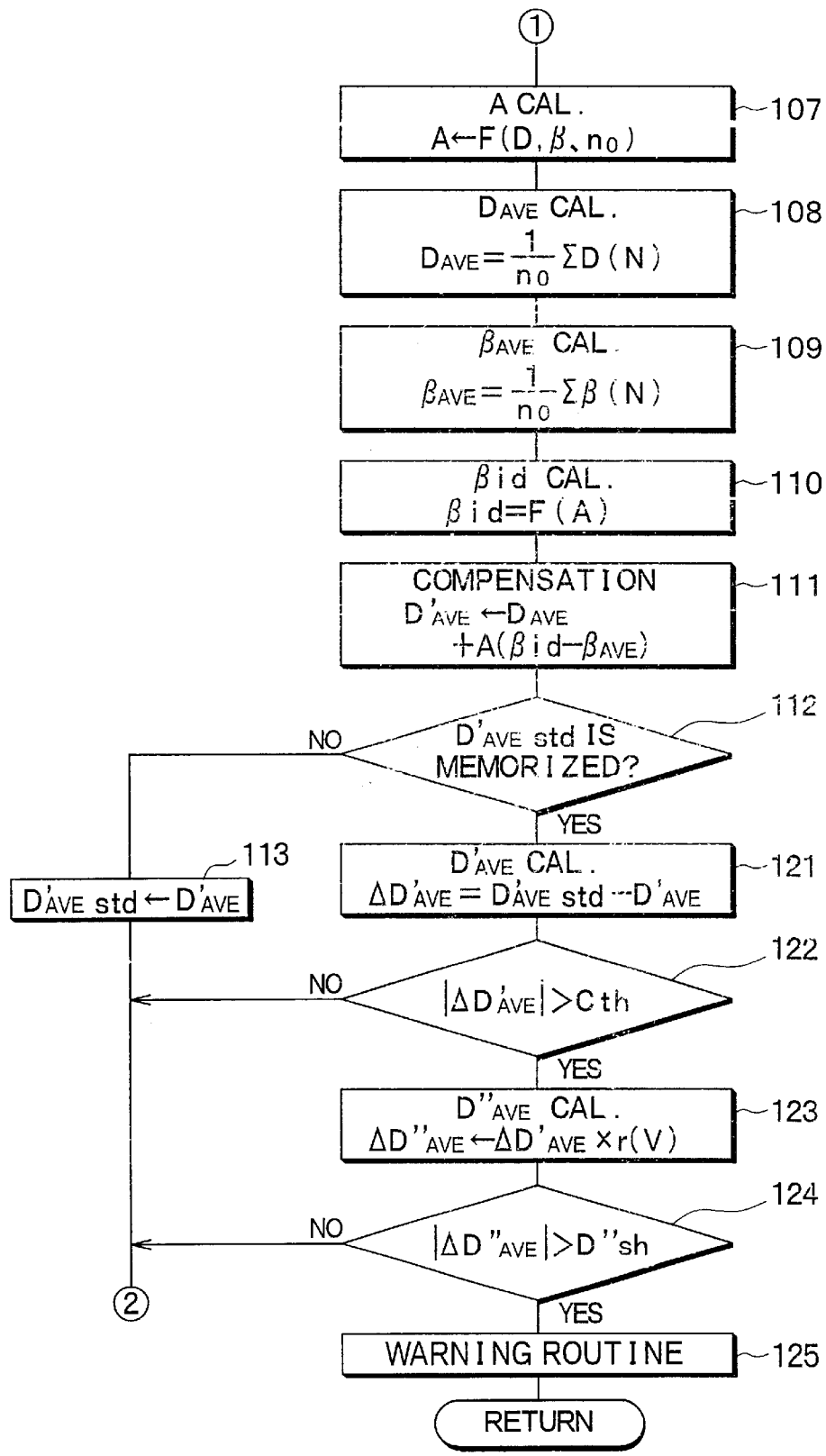
FIG. 9 is a flow diagram showing tire air pressure detecting processing following FIG. 8.
Figure 11:
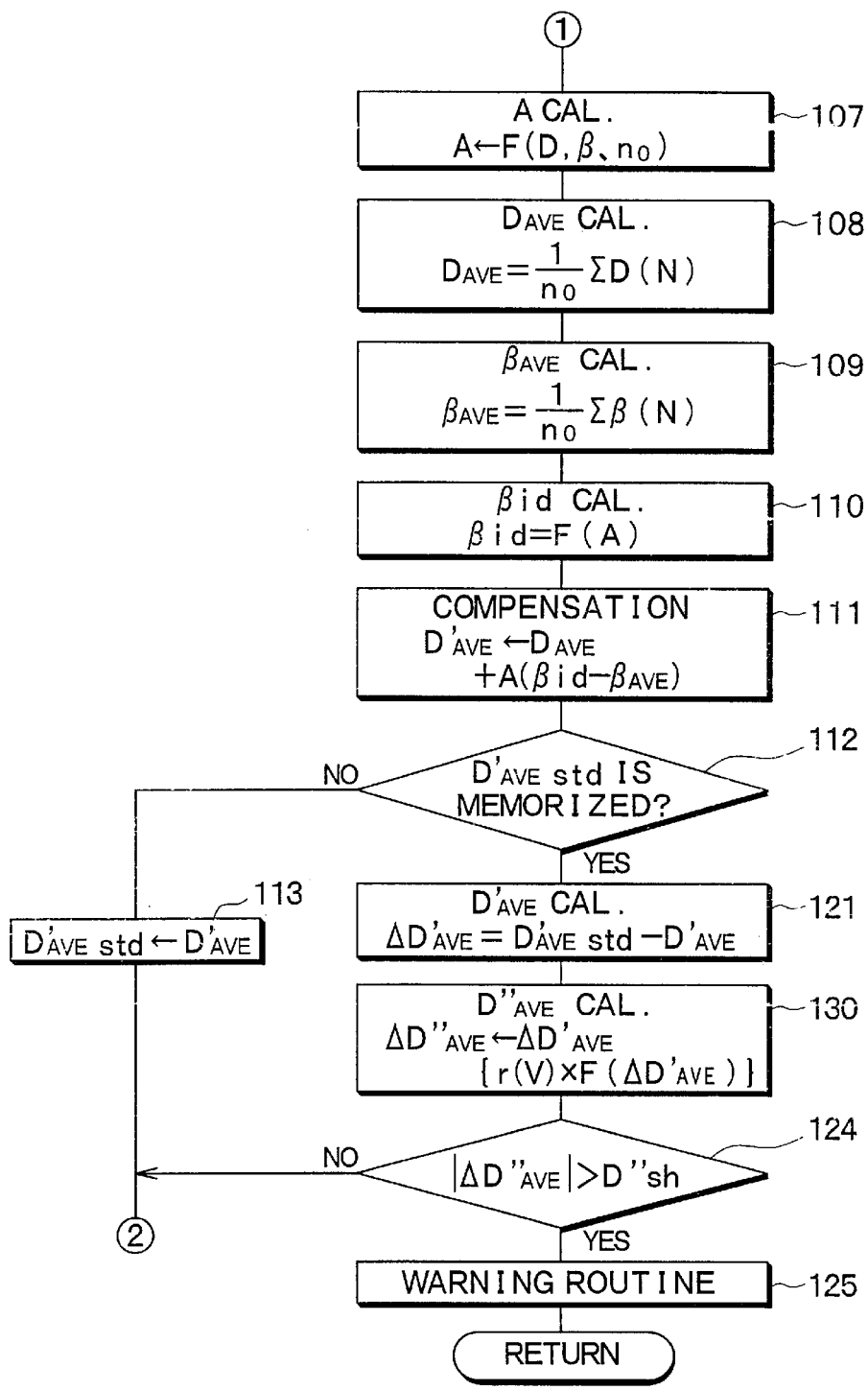
FIG. 11 is a flow diagram showing tire air pressure detecting processing according to a third embodiment of the present invention.

At 100 through 121 shown in FIGS. 8 and 11, processing as in the second embodiment is executed. Thus, the pressure difference determination value $\Delta D'_{AVE}$ is calculated. The processing then advances to 130 to compensate for the pressure difference determination value $\Delta D'_{AVE}$. This compensation processing for the pressure difference determination value $\Delta D'_{AVE}$ is executed as mentioned above. Thereafter, the processing advances to 124 and 125 as in the second embodiment.

According to the tire air pressure device of the present embodiment, a degree of compensation of the pressure difference determination value $\Delta D'_{AVE}$ is adjusted with respect to an offset amount of the pressure difference determination value $\Delta D'_{AVE}$. Therefore, the compensation degree increases when the effect of tread-lift is large, and decreases when the effect of tread-lift is small. As a result, an appropriate pressure difference determination value can be calculated even if the dynamic rolling radius of the tire increases by the effect of tread-lift, and tire air pressure can be accurately detected.

(Fourth embodiment)

In the second embodiment, the compensation processing without the effect of tread-lift is executed when the pressure difference determination value $\Delta D'_{AVE}$ exceeds a predetermined threshold Cth. Also, in the third embodiment, the compensation degree without the effect of tread-lift is adjusted with respect to the offset amount of the pressure difference determination value $\Delta D'_{AVE}$. However, compensation processing as in the second and third embodiments is not needed if the compensation processing without the effect of tread-lift is not executed during the initializing mode.

Details of tire air pressure determination processing will now be described with reference to FIG. 12. Since the tire air pressure determination processing is almost the same as in the second embodiment, portions identical to those in FIG. 8 are omitted.

Figure 12:
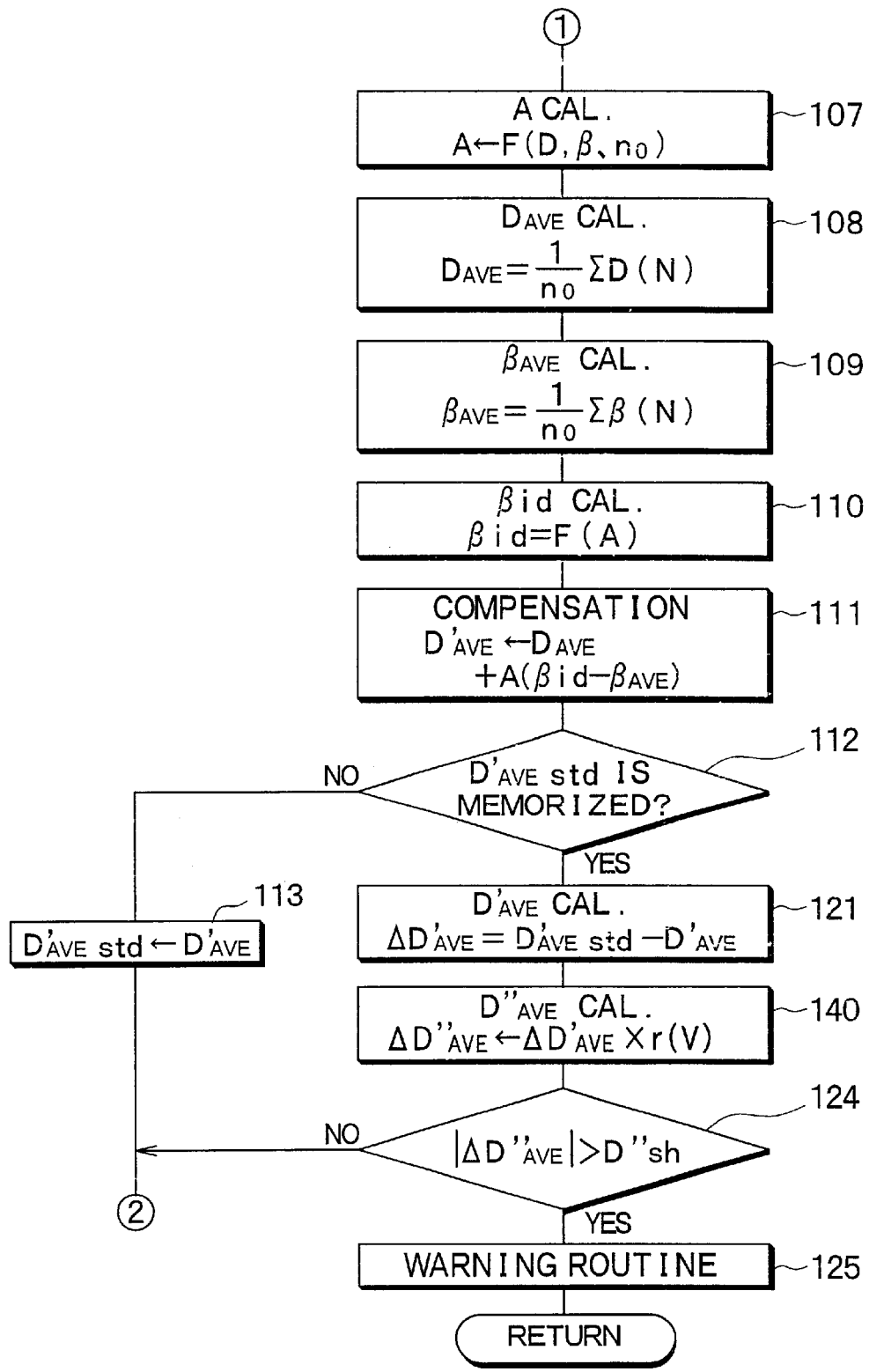
FIG. 12 is a flow diagram showing tire air pressure detecting processing according to a fourth embodiment of the present invention.

Referring to FIG. 12, at 140, the pressure difference determination value $\Delta D'_{AVE}$ is compensated for every time as at 123 in the second embodiment. However, at 112, the compensation processing without the effect of tread-lift as in the second and third embodiment is not executed during the initializing mode. Thus, the pressure difference determination value $\Delta D'_{AVE}$ is not compensated for while the reference value $D'_{AVE}$std is calculated when respective tire air pressures of respective vehicle wheels $1a$–$1d$ are identical. Therefore, initializing mode processing is appropriately executed.

(Fifth embodiment)

Figure 13:
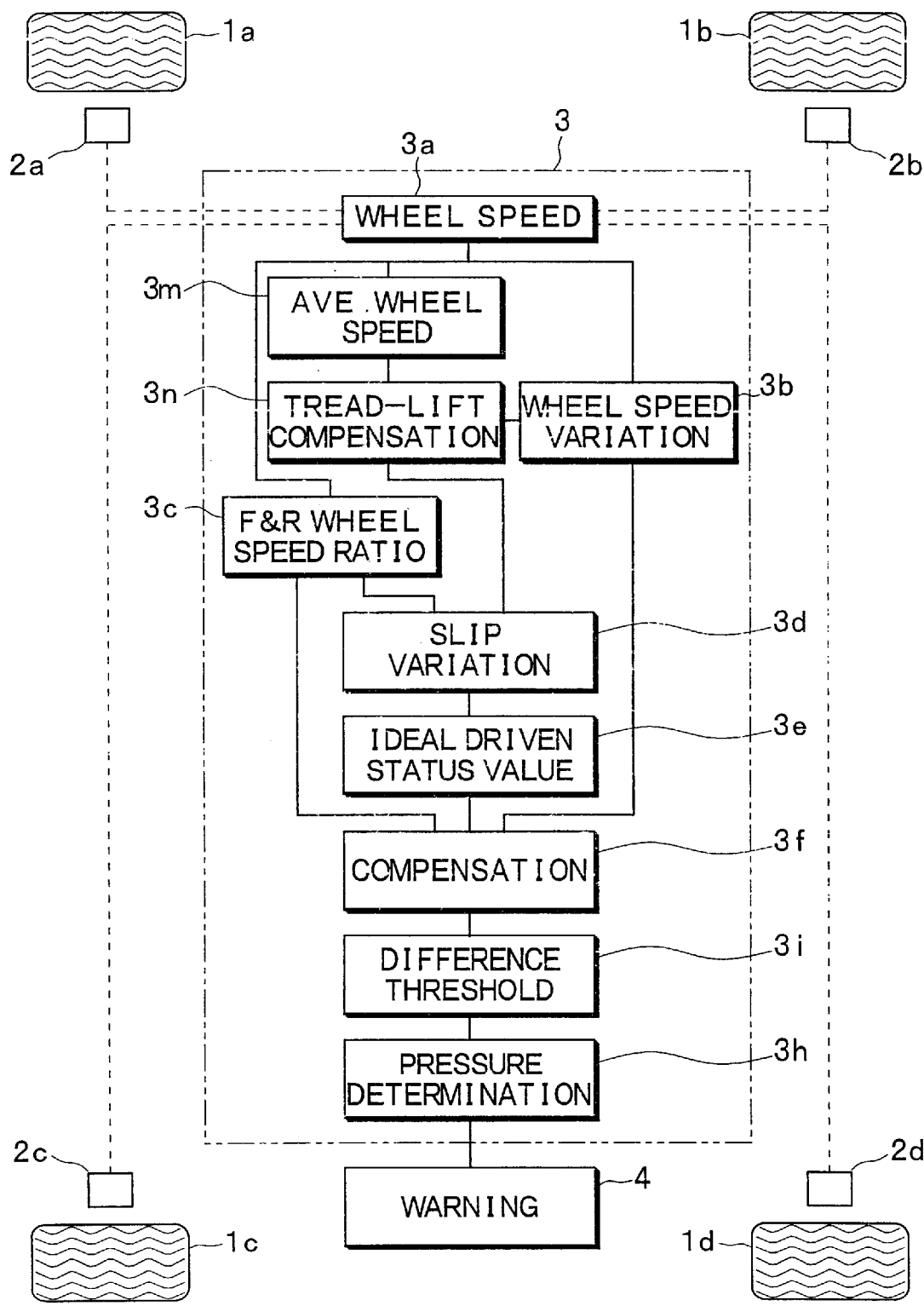
FIG. 13 is a schematic view showing a tire air pressure detection device according to a fifth embodiment of the present invention.

In a fifth embodiment of the present invention shown in FIG. 13, a tire air pressure detection device has a different construction from the first embodiment. As shown in FIG. 13, in this embodiment, the tire air pressure detection device is modified with respect to the tire air pressure detection devices in the first and second embodiments.

In the present embodiment, a wheel speed variation processing portion $3b$ basically executes the same processing as in the first embodiment, but executes averaging processing by thorough different averaging processing. Specifically, a wheel speed variation averaging portion of the wheel speed variation processing portion $3b$ calculates an average value $D_{AVE}$ of a wheel speed variation D based on compensated for data (a wheel speed variation D'). That is, the average value $D_{AVE}$ of a wheel speed variation D is not directly calculated based on data stored in a first wheel speed variation memorizing portion.

A CPU 3 has an average wheel speed processing portion $3m$. The average wheel speed processing portion $3m$ includes an average wheel speed calculating portion and an average wheel speed memorizing portion. In the average wheel speed processing portion $3m$, an average wheel speed $V_{AVE}$, which is the average value of respective vehicle wheel speeds $V_{FL}$, $V_{FR}$, $V_{RL}$ and $V_{RR}$, is calculated by the average wheel speed calculating portion, and is thereafter stored in the average wheel speed memorizing portion. A value that is equal to a summation of the vehicle wheel speeds $V_{FL}$, $V_{FR}$, $V_{RL}$ and $V_{RR}$ divided by 4 (total wheel number) is used as the average wheel speed average $V_{AVE}$. Also, a value that equals to a summation of three of the vehicle wheel speeds $V_{FL}$, $V_{FR}$, $V_{RL}$ and $V_{RR}$ divided by 3 may alternatively be used as the average wheel speed average $V_{AVE}$. This is because one of the vehicle wheel speeds $V_{FL}$, $V_{FR}$, $V_{RL}$ and $V_{RR}$ may be higher than the others due to a tire air pressure decrease.

The CPU 3 further has a tread-lift compensation processing portion 3n. The tread-lift compensation processing portion 3n includes a compensation value feature learning portion, a tread-lift compensating portion and a third wheel speed variation memorizing portion.

The compensation value feature learning portion classifies the wheel speed variation D stored in the first wheel speed variation memorizing portion of the wheel speed variation processing portion 3b according to each range of vehicle speeds. The compensation value feature learning portion also calculates each average value of the each range of vehicle speed, and learns a change of the wheel speed variation D to vehicle speed by calculating a regression line or a regression curve based on a dotted graph of each average value of each range of vehicle speeds.

The tread-lift compensating portion compensates for the wheel speed variation D by generating a wheel speed variation D*, which corresponds to a wheel speed variation D when the effect of tread-lift is small, based on the change of the wheel speed variation D to vehicle speed. The tread-lift compensating portion basically compensates for the wheel speed variation D based on a learned result of the compensation value feature learning portion. However, the tread-lift compensating portion compensates for the wheel speed variation D based on predetermined deformation feature before compensation value feature learning portion learns. The tread-lift compensating portion corresponds to a first rotational status value compensating portion.

The third wheel speed variation memorizing portion stores the wheel speed variation D* compensated for by the tread-lift compensating portion. Thus, the tread-lift compensation processing portion 3n completes the compensation processing of the wheel speed variation D.

In this case, the wheel speed variation averaging portion of the wheel speed variation processing portion 3b calculates the average value $D_{AVE}$ by averaging respective wheel speed variation D*. The average value $D_{AVE}$ of the respective wheel speed variation D* corresponds to an average of $n_0$ portions of the wheel speed variation D expressed by the following equation.

$$D_{AVE} = \frac{1}{n_0} \Sigma D*(N) \qquad (3)$$

A slip variation calculating portion 3d, an ideal driving status value calculating portion 3e, a wheel speed variation compensation processing portion 3f, a pressure difference threshold calculating portion 3i and a tire air pressure decrease determination portion 3h basically execute the same processing as in the first embodiment.

However, the slip variation calculation portion 3d calculates a slip variation A based on the wheel speed variation D* stored in the third wheel speed variation memorizing portion of the tread-lift compensation processing portion 3n and a front and rear wheel speed ratio β calculated by a front and rear wheel speed ratio calculating portion of the front and rear wheel speed ratio processing portion 3c. That is, the wheel speed variation D* is applied to the calculation of a post-compensation wheel speed variation $D'_{AVE}$ or the like instead of the wheel speed variation D.

Figure 14:
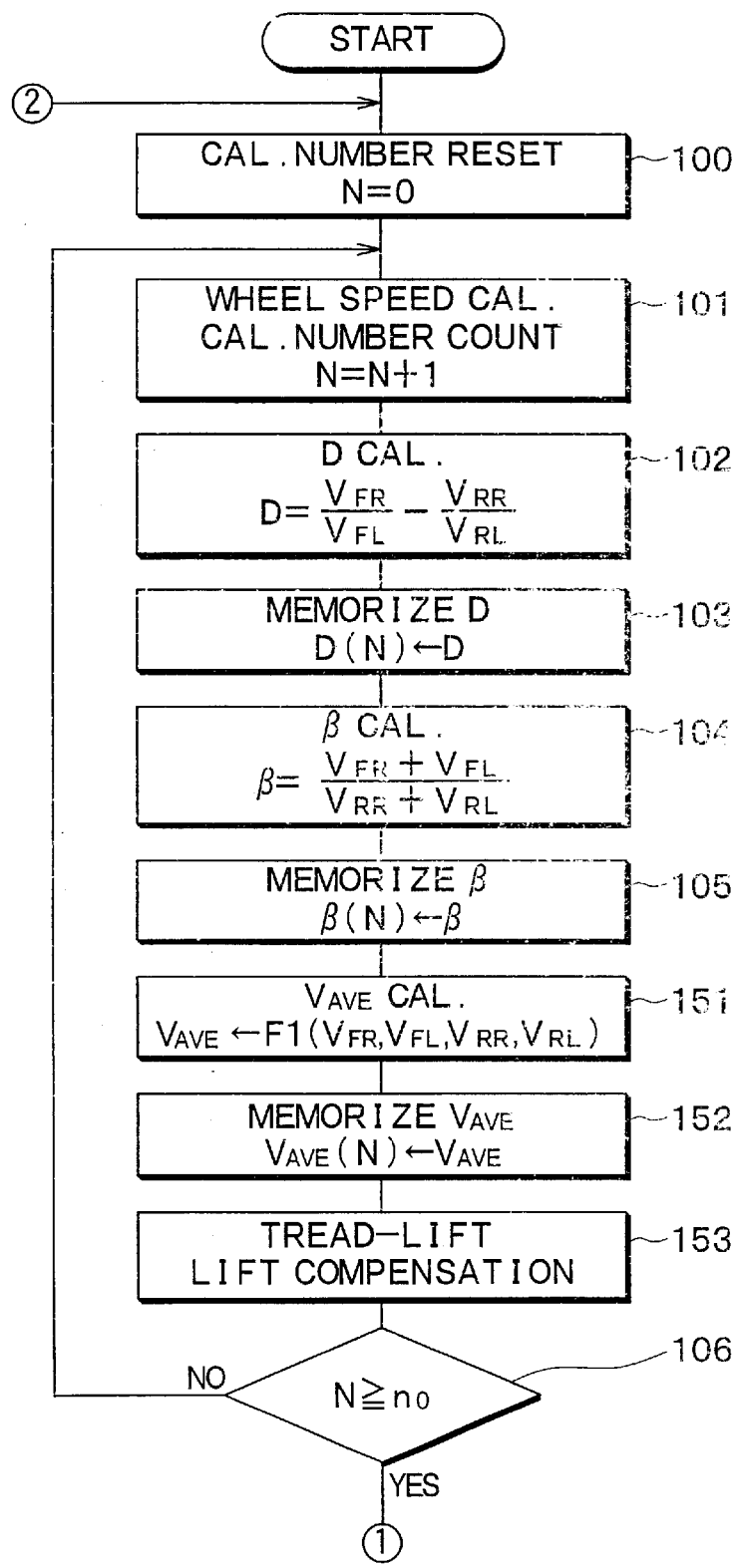
FIG. 14 is a flow diagram showing tire air pressure detecting processing according to the fifth embodiment.
Figure 15:
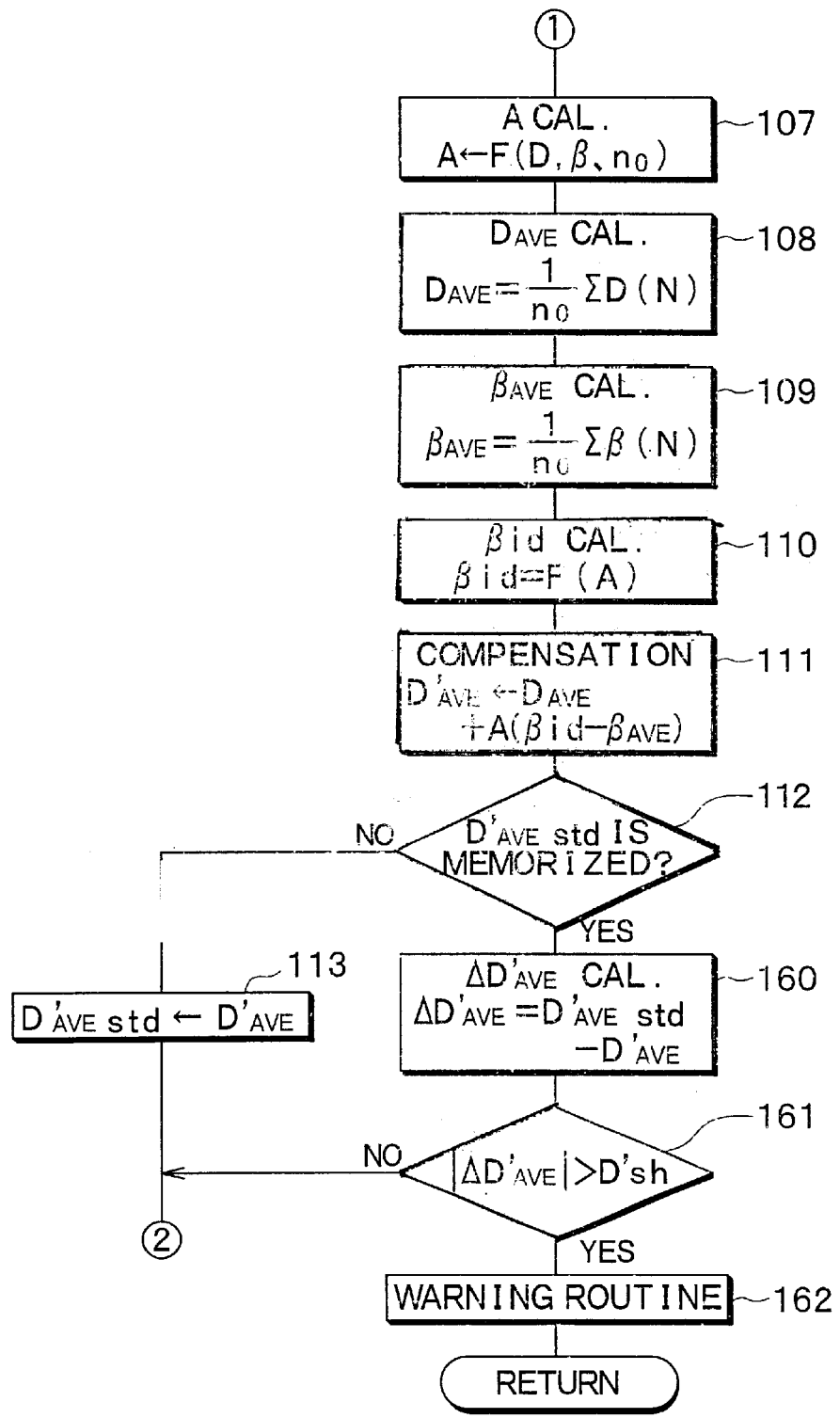
FIG. 15 is a flow diagram showing tire air pressure detecting processing following FIG. 14.
Figure 16:
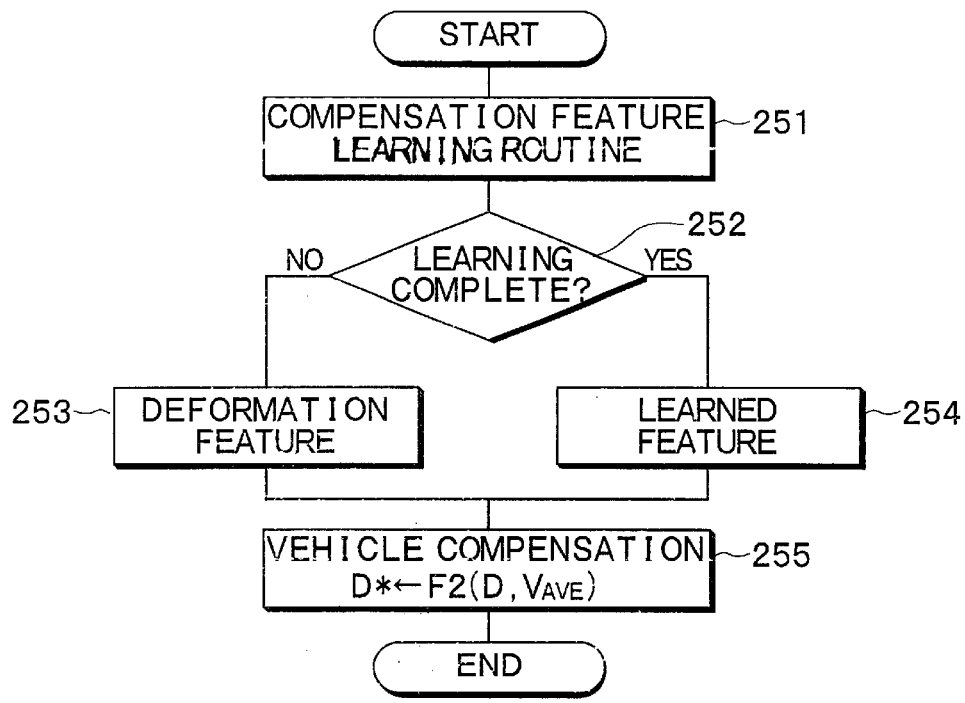
FIG. 16 is a flow diagram showing tread-lift compensating processing shown in FIG. 14.

Details of tire air pressure determination processing will now be described with reference to FIGS. 14–16. FIGS. 14 and 15 are flow diagrams showing tire air pressure detecting processing. FIG. 16 is a flow diagram showing tread-lift compensation processing.

At 100 through 105, processing as in the first embodiment is executed. At 151, during average wheel speed calculating processing, the average wheel speed $V_{AVE}$ corresponding to an average value of respective vehicle wheel speeds $V_{FL}$, $V_{FR}$, $V_{RL}$ and $V_{RR}$ is calculated by the average wheel speed calculating portion of the average wheel speed processing portion 3m as in the same manner mentioned above.

At 152, the average wheel speed memorizing portion stores the average wheel speed $V_{AVE}$ calculated at 151 to add memorized average wheel speeds $V_{AVE}(N)$. Incidentally, $V_{AVE}(N)$ corresponds to an arrangement of $n_0$ memorized portions of the average wheel speeds $V_{AVE}$ stored in a position of the memory corresponding to a wheel speed calculation number. The average wheel speed memorizing portion re-stores a new average wheel speed $V_{AVE}$ in the position of the memory corresponding to wheel speed calculation number N after the $n_0$ portions of the average wheel speeds $V_{AVE}$ are stored.

At 153, tread-lift compensation processing is executed by the compensation value feature learning portion, the tread-lift compensating portion and the third wheel speed variation memorizing portion of the tread-lift compensation processing portion 3n. The tread-lift compensation processing will now be described with reference to FIG. 16.

At 251, compensation feature learn processing is executed based on the wheel speed variation D and the average wheel speed $V_{AVE}$ as follows.

An available vehicle speed range in which a vehicle is able to drive is classified into) several speed ranges. The current average calculated wheel speed $V_{AVE}$ is correlated to one of the several speed ranges to which the average wheel speed $V_{AVE}$ belongs. For example, a vehicle speed range from 85 km/h to 155 km/h is classified to 14 speed ranges by dividing at every 5 km/h. When the current average calculated wheel speed $V_{AVE}$ is 100 km/h, it belongs to the fourth speed range. Thus, all currently calculated average wheel speeds $V_{AVE}$ are respectively distinguished.

The currently calculated wheel speed variation D is also correlated to the same speed range as the average wheel speeds $V_{AVE}$ and added to the summation of the wheel speed variation D. Further, a count of a counter (not shown) is increased in order to recognize data in the speed range in which data of the currently calculated wheel speed variation D is added.

The tread-lift compensation processing portion 3n determines a number of speed ranges having amounts of data larger than a predetermined number (e.g., 15). When the number of speed ranges is bigger than a predetermined value (e.g., 4), each average value of the wheel speed variation D in each speed range having the predetermined number data and a middle value of the speed range (i.e., 87.5 km/h is a middle value when the speed range is a range from 85 km/h to 90 km/h) are calculated. Further, maximum and minimum values of average values of the wheel speed variation D are compared. When a difference of the maximum and minimum values is below, for example, 0.04, entire average values of the wheel speed variation D of respective speed range are defined at 0.

Thereafter, the tread-lift compensation processing portion 3n calculates a regression curve (or a regression line) using minimum square calculation methodology if each average value of the wheel speed variation D in each speed range having the predetermined number data and a middle value of the speed range are dotted. A regression curve equation expresses a change of the wheel speed variation D, and therefore the compensation feature is obtained based on the regression curve equation. That is, because the wheel speed variation D changes against vehicle speed as with the regression curve equation, the change of the wheel speed variation D caused by the effect of tread-lift is assumed based on the regression curve equation. Therefore, a compensation value for removing the effect of tread-lift from the wheel speed variation D can be learned. Then, a flag is set when calculation of the regression curve (or regression line) is completed and a relational equation of the each vehicle speed and the compensation value is calculated based on the regression curve. Thus, the compensation feature learn processing is completed.

At 252, the tread-lift compensation processing portion 3n determines whether the compensation feature learn processing is completed. Specifically, it is determined based on whether the calculation of the regression curve (or regression line) is completed or not and whether the relational equation of each vehicle speed and the compensation value is calculated. That is, the tread-lift compensation processing portion 3n determines that the compensation feature learn processing is completed when the flag is set.

When a determination at 252 is negative, the processing advances to 253 to select that predetermined deformation feature for being applied as the tread-lift compensation because the compensation feature learn processing is not completed. The deformation feature is defined by, for example, an experiment that investigates a change of a wheel speed variation D against a vehicle speed when tire air pressure is decreased to 1 atm from standard pressure. When the determination at 252 is positive, the processing advances to 254 to select the compensation feature obtained at 251 for application as the tread-lift compensation.

At 255, the wheel speed variation D is compensated for based on the predetermined deformation feature or the relational equation of each vehicle speed and the compensation value calculated by the learned compensation feature. Thus, a wheel speed variation D* is calculated by removing the effect of tread-lift with respect to vehicle speed from the wheel speed variation D. Specifically, wheel speed variation D* is calculated by adding the compensation value to the wheel speed variation D.

Figure 17:
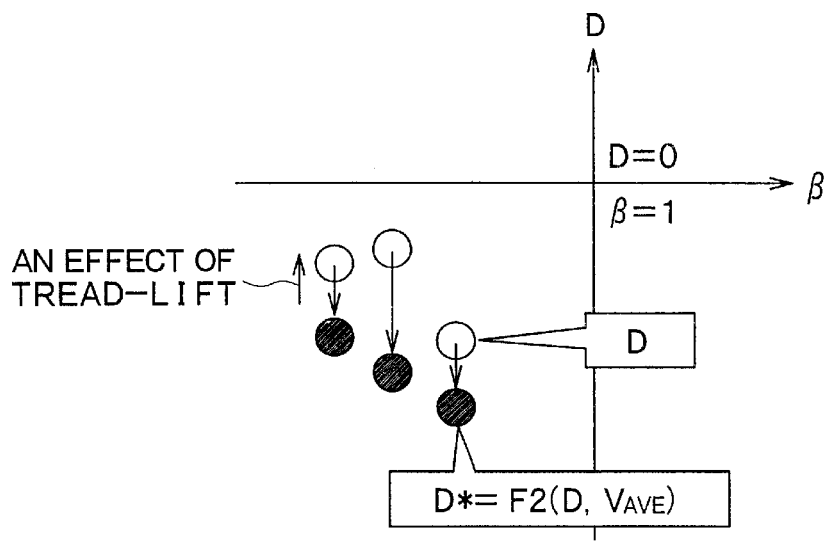
FIG. 17 shows a relationship between wheel speed variations D, D' according to the fifth embodiment.

When the tread-lift compensation processing is executed, a relationship between the wheel speed variation D, D* and a front and rear wheel speed ratio β is illustrated in FIG. 17. In FIG. 17, white circles (○) indicate the relationship between wheel speed variation D and the front and rear wheel speed ratio β, and black circles (●) indicate the relationship between the wheel speed variation D* and the front and rear wheel speed ratio β. As shown in FIG. 17, the wheel speed variation D* without the effect of tread-lift can be calculated by compensating for the wheel speed variation D with respect to vehicle speed even if the wheel speed variation D varies due to the effect of tread-lift.

After the tread-lift compensation processing is completed, at 106 through 112, processing as in the first embodiment is executed. However, in the processing at 106 through 112, the wheel speed variation D* is applied for calculating respective values instead of the wheel speed variation D, and a post-compensation wheel speed variation $D'_{AVE}$ is calculated based on the respective values at 111.

Figure 18:
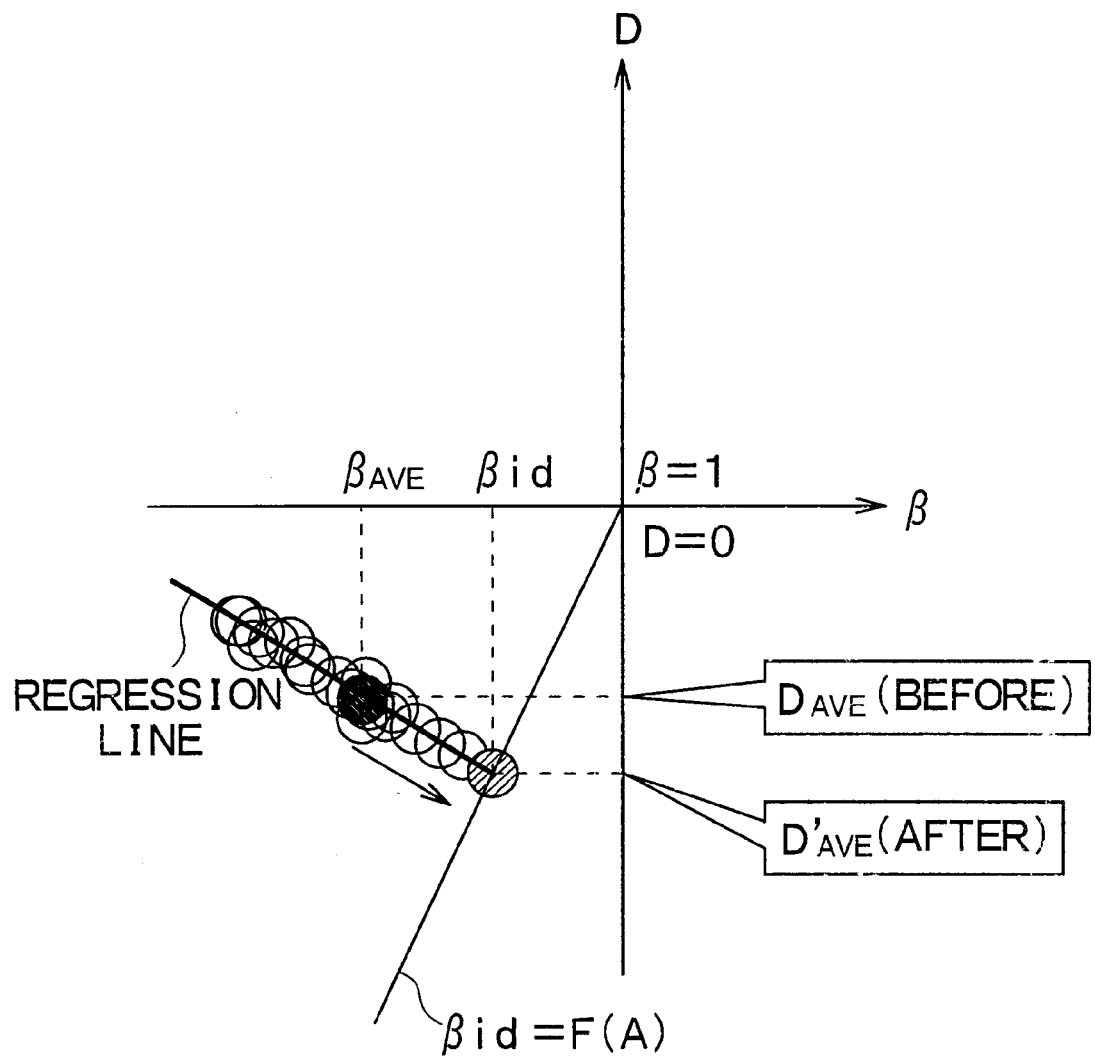
FIG. 18 shows a relationship between a wheel speed variation average $D_{AVE}$ and a post-compensation wheel speed variation $D'_{AVE}$ according to the fifth embodiment.

A relationship between the post-compensation wheel speed variation $D'_{AVE}$ and each value (the value $D_{AVE}$, the slip variation A, the ideal driven status value βid, and the average value $β_{AVE}$) for calculating the post-compensation wheel speed variation $D'_{AVE}$ is shown in FIG. 18.

FIG. 18 shows a relationship between the wheel speed variation D* and the front and rear wheel speed ratio β when tire air pressure of one of the driven wheels 1c, 1d (e.g., the left rear wheel) decreases. In FIG. 5, white circles (○) indicate $n_0$ portions of the relationship between the wheel speed variation D* and the front and rear wheel speed ratio β, and black circles (●) indicate a relationship between the average value $D_{AVE}$ of the wheel speed variation D* and the average value $β_{AVE}$ of the front and rear wheel speed ratio β.

If the tire air pressure of the left rear wheel that is one of the driven wheels 1c, 1d decreases, the vehicle wheel speed $V_{RL}$ of the left rear wheel increases. Therefore, the front and rear wheel speed ratio β decreases below 1 according to the tire air pressure decrease. Since an ideal driving status value βid satisfies the equation βid=F(A) when there is no tire slippage, it is therefore calculated based on the slip variation A and the equation βid=F(A) as at 110.

Further, as shown at 107, a regression line corresponding to a linear function of no portions of the wheel speed variation D and the front and rear wheel speed ratio β is calculated using minimum square calculation methodology.

Accordingly, as shown at 111, upon calculating an intersection point of the regression line and the equation βid=F(A), a post-compensation wheel speed variation $D'_{AVE}$, which corresponds to a wheel speed variation D* under an ideal driving status when tire air pressure of at least one of the driven wheels 1c, 1d decreases, is calculated. Thus, the post-compensation wheel speed variation $D'_{AVE}$ can be calculated without excessive compensation.

When the determination at 112 is negative, the processing advances to 113 to store the post-compensation wheel speed variation $D'_{AVE}$ calculated now as a reference value $D'_{AVE}$std and then returns at 100. To the contrary, the processing advances to 160 when the determination at 112 is positive.

At 160, during pressure difference determination value calculation processing, a pressure difference threshold calculating portion 3i calculates a pressure difference determination value $ΔD'_{AVE}$ that equals a difference between the reference value $D'_{AVE}$std and the post-compensation wheel speed variation $D'_{AVE}$ ($ΔD'_{AVE}=D'_{AVE}$std$-D'_{AVE}$).

At 161, the tire air pressure decrease determination portion 3h determines whether an absolute value $|ΔD'_{AVE}|$ of the pressure difference determination value $ΔD'_{AVE}$ is larger than the predetermined threshold value Dsh. The processing advances to 162 when a determination is positive. As a result, the tire air pressure decrease determination portion 3h transmits a warning signal denoting a tire air pressure decrease to the warning device 4. The processing returns at 100 when the determination is negative. Thus, any tire air pressure decrease in any of the respective wheels 1a–1d can be detected.

According to the tire air pressure detection device of the present embodiment, the wheel speed variation D*, which is assumed when the effect of tread-lift is not generated, is calculated by compensating for the wheel speed variation D with respect to vehicle speed. That is, the wheel speed variation D* is calculated every predetermined short interval. Further, the regression line expressing a relationship between wheel speed variation D* and the front and rear wheel speed ratio β is calculated based on the wheel speed variation D*, and the post-compensation wheel speed variation $D'_{AVE}$ in which a slip effect of driven wheels 1c, 1d is removed is calculated based on the regression line.

To remove the slip effect of the driven wheels 1c, 1d, a plurality of wheel speed variations D within a relatively short interval e.g., 2s) are needed. Also, because the effect of tread-lift is directly related to vehicle speed, it is effective to compensate for data of relatively short intervals to remove the effect of tread-lift.

Accordingly, as mentioned above, the wheel speed variation D* in which the effect of tread-lift is removed is calculated by compensating for data of the wheel speed variation D within short intervals using vehicle speed as a parameters. As a result, it is possible to compensate for the slip effect of the driven wheels $1c$, $1d$ based on the wheel speed variation D*, and to accurately detect the tire air pressure decrease.

Further, the post-compensation wheel speed variation $D'_{AVE}$ can be calculated without excessive compensation. As a result, the post-compensation wheel speed variation $D'_{AVE}$ when the tire air pressure of the driven wheel decreases and that when the tire air pressure of the non-driven wheel decreases are identical. Therefore, regardless of which wheels decrease in pressure, the warning pressure remains uniform.

(Sixth embodiment)

In a sixth embodiment, tire air pressure is detected in a manner different from the fifth embodiment. Incidentally, a configuration of a tire air pressure detection device of the sixth embodiment is the same as in the fifth embodiment, but processing executed is differently from the fifth embodiment.

Figure 19:
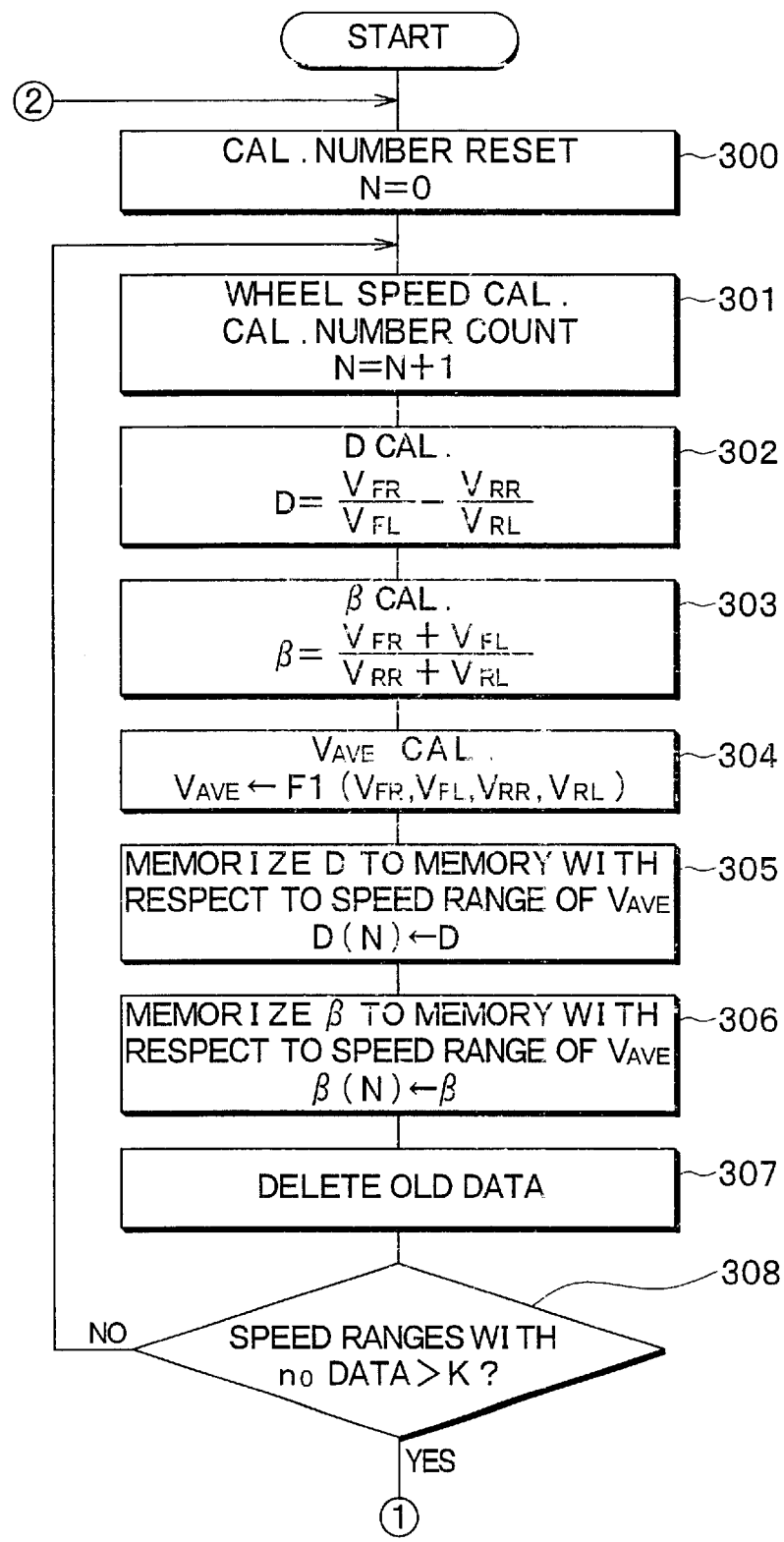
FIG. 19 is a flow diagram showing tire air pressure detecting processing according to a sixth embodiment.
Figure 20:
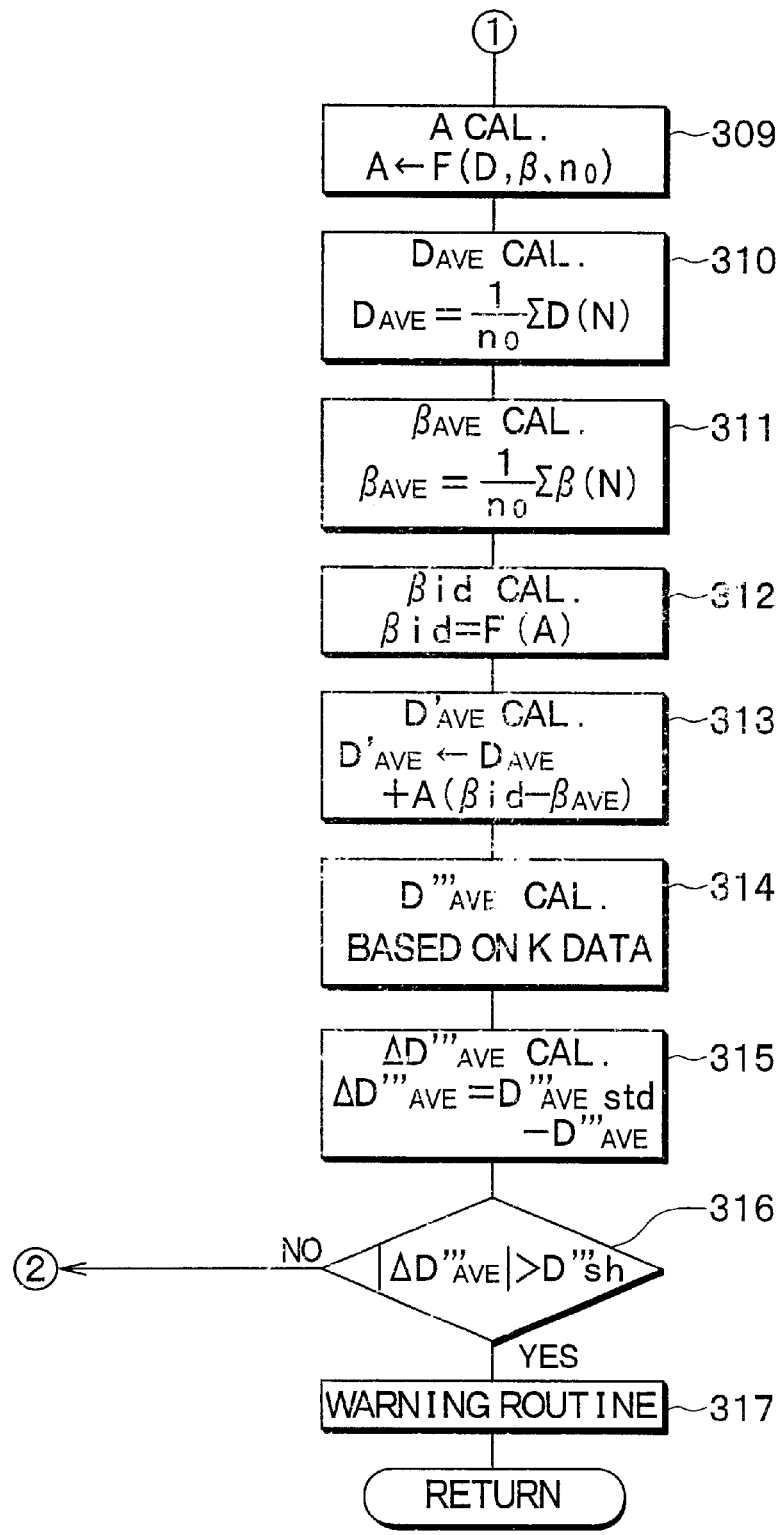
FIG. 20 is a flow diagram showing tire air pressure detecting processing following FIG. 19.
Figure 22:
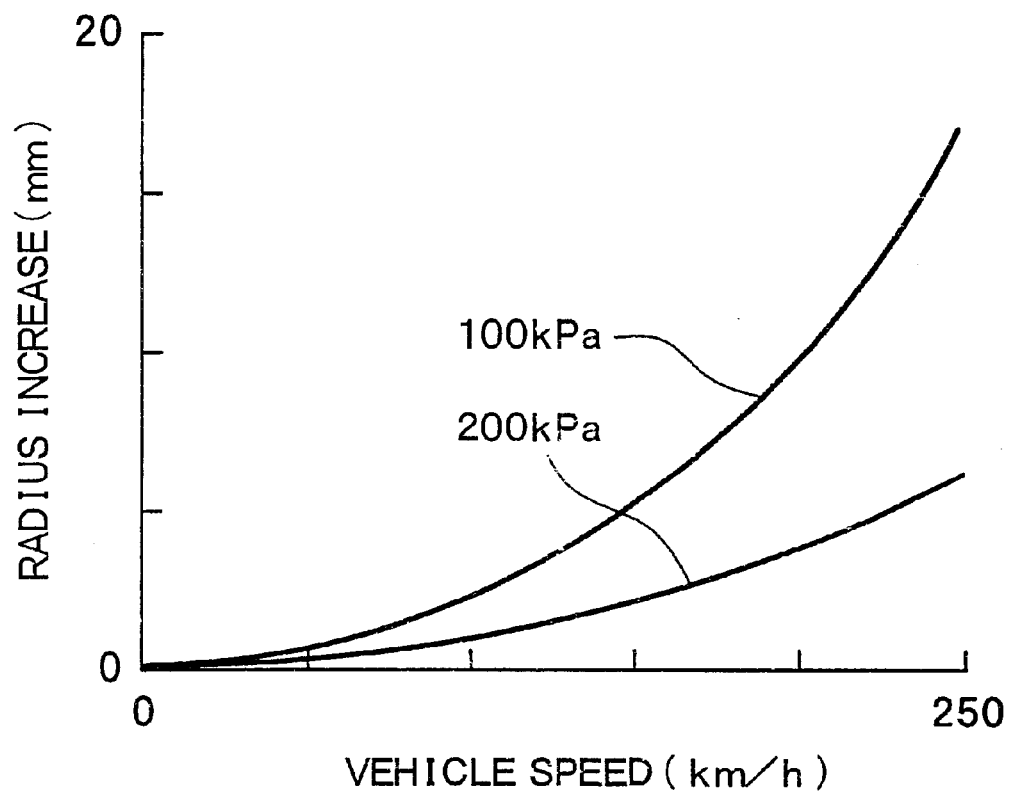
FIG. 22 shows a relationship between vehicle speed and dynamic rolling radius according to a sixth embodiment.
Figure 23:
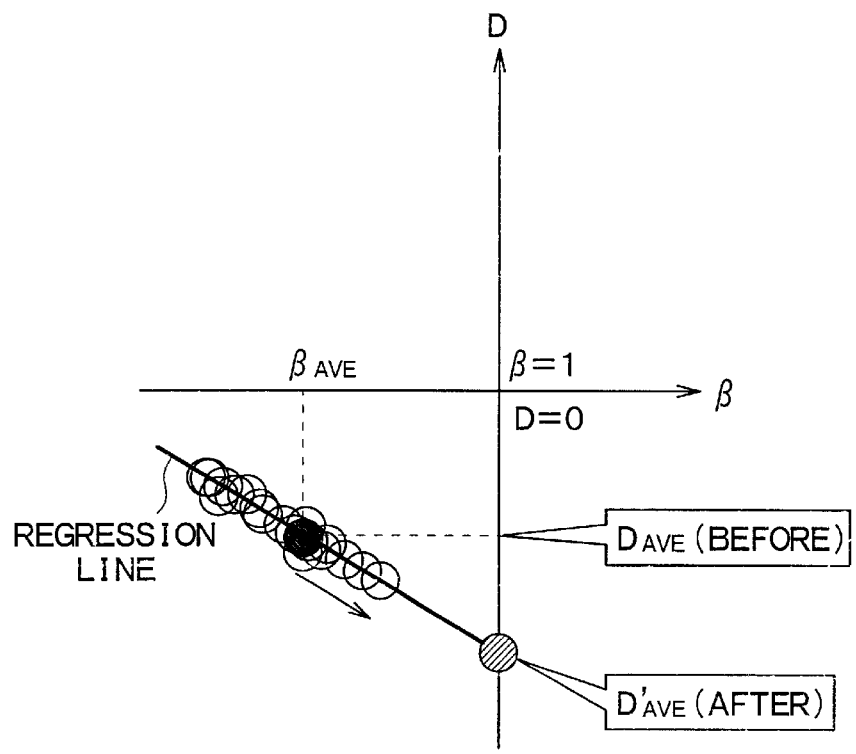
FIG. 23 shows a wheel speed variation average $D_{AVE}$ and a post-compensation wheel speed variation average $D'_{AVE}$ according to a related art device.
Figure 24:
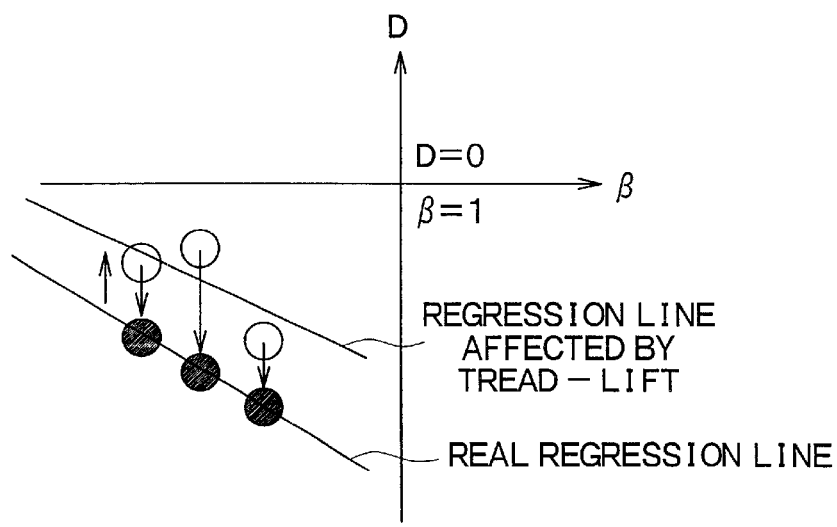
FIG. 24 shows relationship between a real regression line and a regression line calculated when an effect of tread-lift is generated according to the related art device.
Figure 25A:
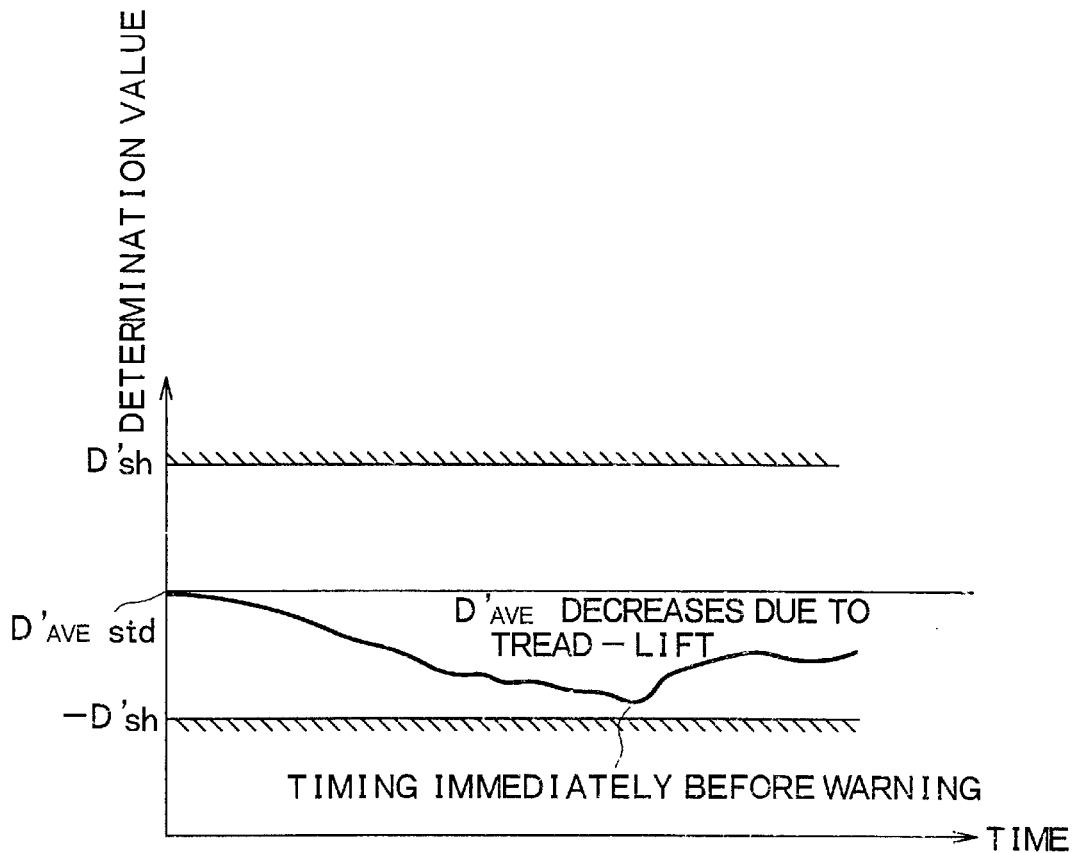
FIG. 25A is a timing diagram of the post-compensation wheel speed variation $D'_{AVE}$ according to the related art device.
Figure 25B:
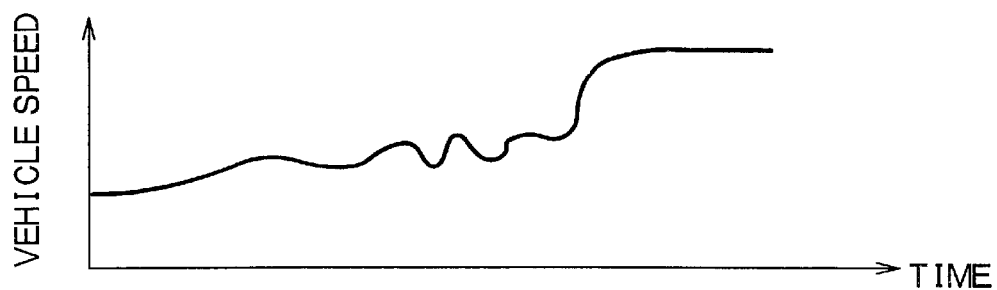
FIG. 25B is a timing diagram of a vehicle speed according to the related art device.

Details of tire air pressure determination processing will now be described with reference to FIGS. 19 and 20.

At 300–302, processing for resetting a wheel speed calculation number N, increasing wheel speed calculation number N, and calculating a relative wheel speed variation D are respectively executed as at 100 through 102 of FIG. 14 in the fifth embodiment. The processing then advances to 303 to calculate a front and rear wheel speed ratio β in the same manner as at 104 in the first embodiment.

The processing advances to 304, and during average wheel speed calculation processing, an average wheel speed $V_{AVE}$ is calculated as in the same manner as at 151 of the fifth embodiment. At 305, the relative wheel speed variation D is stored in a memory corresponding to a speed range with respect to the average wheel speed $V_{AVE}$ calculated at 304. Also, the front and rear wheel speed ratio β is stored in a memory location corresponding to the speed range with respect to the average wheel speed $V_{AVE}$ calculated at 304. The speed range with respect to the average wheel speed $V_{AVE}$ is as defined by the compensation feature learn processing (see at 251 in FIG. 16) of the tread-lift compensation processing in the fifth embodiment. That is, memory locations are equipped so that one location corresponding to the speed range of the average wheel speed $V_{AVE}$ stores the relative wheel speed variation D and the front and rear wheel speed ratio β.

The processing advances to 307 to execute processing for removing old data in each memory location. Specifically, a counter is equipped with respect to each data memory location in each speed range. Each counter is incremented when data is stored in any one of the memory locations of any speed range even if the data is not stored in the memory locations associated with the other counters. Therefore, each interval in which data is stored in one of the memory locations is recognized.

The data is then deleted when the counter corresponding to the data has counted for a predetermined time (e.g., 10 minutes). Accordingly, when tire air pressures begin to decrease, the regression line is not calculated using old data such as data calculated prior to a decrease in tire air pressure.

At 308, the tread-lift compensation portion $3n$ determines whether a number of speed ranges having a predetermined data number $N_0$ is at least K. The processing advances to 309 when the number of speed ranges is at least K, while returning at 301 when the number of speed ranges is less than K.

At 309 through 313, a slip variation A, an average value $D_{AVE}$ of the wheel speed variation D, an average value $β_{AVE}$ of the front and rear wheel speed ratio β, an ideal driving status value βid, and a post-compensation wheel speed variation $D'_{AVE}$ are calculated for every speed range having the predetermined data number $N_0$ in parallel. This processing is executed in the same manner as at 107 through 111 of the fifth embodiment. However, in the present embodiment, since the tread-lift compensation mentioned in the fifth embodiment is not executed, the processing is executed using the wheel speed variation D calculated at 302.

Thereafter, the processing advances to 314, and a reference value $D'''_{AVE}std$ with a vehicle speed Vbase on which an effect of tread-lift is negligible is calculated based on the predetermined data number $N_0$ at every speed range. FIG. 21 shows relationships between a slip variation A and the post-compensation wheel speed variation $D'_{AVE}$ in each speed range according to a sixth embodiment. The processing at 314 will now be described with reference to FIG. 21.

For example, if speed ranges of 110 km/h, 140 km/h, 160 km/h and 180 km/h are the ranges having the predetermined data number $N_0$, respective relationships between the wheel speed variation D and the front and rear wheel speed ratio β are illustrated in (a) of FIG. 21, and therefore the slip variation A of each speed range is calculated. Also, the post-compensation wheel speed variation $D'_{AVE}$ is calculated based on the slip variation A of each speed range. In this case, although the wheel speed variation D is not compensated for without the effect of tread-lift, the post-compensation wheel speed variation $D'_{AVE}$ is calculated without the effect of tread-lift at every speed range because the effect of tread-lift of the wheel speed variation D is approximately the same at every speed range.

A relationship between the post-compensation wheel speed variation $D'_{AVE}$ and the speed range is shown with white circles (○) in (b) of FIG. 21. Therefore, the regression curve is calculated using minimum square calculation methodology based on the post-compensation wheel speed variation $D'_{AVE}$. Black circles (●) indicate a post-compensation wheel speed variation $D'_{AVE}$ with a vehicle speed base (e.g., 80 km/h) on which an effect of tread-lift can be negligible.

After the regression curve is calculated, the post-compensation wheel speed variation $D'_{AVE}$ is compensated for in the same manner as at 251 shown in FIG. 16 of the fifth embodiment to calculate the reference value $D'''_{AVE}std$ with a vehicle speed Vbase on which an effect of tread-lift can be negligible.

The processing then advances to 315. At 315 through 317, calculating a pressure difference determination value $ΔD'''_{AVE}$, comparing the pressure difference determination value $ΔD'''_{AVE}$ and a threshold value $ΔD'''sh$, and transmitting a warning signal to a warning device 4 are respectively executed as the same processing as at 160 through 162 in the fifth embodiment.

(Modification)

In the first embodiment, the tire air pressure decrease is detected by determining whether the post-compensation wheel speed variation $D'_{AVE}$ exceeds the warning threshold. However, it may alternatively be detected by determining a difference determination value $ΔD'_{AVE}$ corresponding to a difference between the reference value $D'_{AVE}std$ and the post-compensation wheel speed variation $D'_{AVE}$ ($ΔD'_{AVE}= D'_{AVE}std - D'_{AVE}$) exceeds a warning threshold defined at a predetermined distance (D'sh) from the reference value $D'_{AVE}std$.

In the second to fourth embodiments, the compensation equation is an example. Other compensation equations can alternatively be adapted for compensating for the difference determination value. For example, since appropriate compensation equations are different with respect to tire air pressure decrease depending on regression line location, different equations can be adapted with respect to the tire air pressure decrease depending on the regression line location.

In the second to fourth embodiments, the difference determination value $\Delta D'_{AVE}$ is applied for determining tire air pressure decrease. However, other values such as the wheel speed variation D are applied for determining tire air pressure decrease.

In the first to sixth embodiments, respective tire air pressure detection devices are adapted for use in a rear wheel drive vehicle, but can alternatively be adapted for use in a front wheel drive vehicle. In such a case, an ideal driving status value βid is at least 1 with respect to the tire air pressure decrease of a driven wheel.

In the first to sixth embodiments, the wheel speed variation D is calculated as a rotational status value using equation (1). However, other equations can alternatively be used for calculating the rotational status value. That is, the rotational status value is a value expressing a relationship of respective wheels 1a–1d so as to cancel a wheel speed variation between left and right wheels generated due to vehicle turns. For example, the following equations can be used for the calculation.

$$D = \frac{V_{RR}}{V_{RL}} - \frac{V_{FR}}{V_{FL}} \tag{9}$$

$$D = (V_{FR} + V_{RL}) - (V_{FL} + V_{RR}) \tag{10}$$

$$D = \frac{\frac{V_{FR} + V_{RL}}{2} - \frac{V_{FR} + V_{RR}}{2}}{\frac{V_{FR} + V_{FL} + V_{RR} + V_{RL}}{4}} \tag{11}$$

These above equations express relationships of respective wheels 1a–1d so as to cancel wheel speed variations between left and right wheels generated due to vehicle turns by calculating differences between left front and rear wheel speeds and between right front and rear wheel speeds. This is because wheel speed variations may be generated between the left front and rear wheel speeds and between right front and rear wheel speeds.

Regarding a tire air pressure detection device that warns of tire air pressure decrease when a wheel speed variation D exceeds a predetermined threshold, compensation processing for the wheel speed variation D caused by tire slippage is unnecessary if a slip variation (a slope of a regression line) A is small due to the following reasons. When the tire air pressure decreases in one of the rear wheels (i.e., driven wheels), a slight error is allowed because the wheel speed variation D does not exceed the predetermined threshold when the slip variation A is small. In addition, when the tire air pressure decreases in one of the front wheels (i.e., non-driven wheels), the slip variation A is approximately zero. Therefore, upon removing the compensation processing when the slip variation A is small, it is possible to remove data when compensation processing is not needed even if tire air pressure of one of the rear wheels decreases and when tire air pressure of one of the front wheels decreases.

In the first to sixth embodiments, the post-compensation wheel speed variation $D'_{AVE}$ is calculated by putting the average value $D_{AVE}$ on the regression line expressed by $\beta id = F(A)$ after the average value $D_{AVE}$ is calculated. However, the post-compensation wheel speed variation $D'_{AVE}$ may be calculated by putting the respective wheel speed variation D on the regression line by $\beta id = F(A)$ and averaging them.

In the first to sixth embodiments, the average value $D_{AVE}$, the average value $D_{AVE}$, difference determination value $\Delta D'_{AVE}$ and the absolute value $|\Delta D'_{AVE}|$ are calculated based on $n_0$ portions of the wheel speed variation D and the front and rear wheel speed ratio β when the number of calculations N reaches $n_0$. However, in this case, tire air pressure decrease is not detected until all $n_0$ portions of data are renewed. Accordingly, upon calculating a moving average, tire air pressure decrease can be detected even if all $n_0$ portions of data are not renewed. The moving average renews the oldest data of the wheel speed variation D and the front and rear wheel speed ratio β stored in the wheel speed variation memorizing portion and the front and rear wheel speed ratio memorizing portion. Then, the average value $D_{AVE}$ and the average value $\beta_{AVE}$ are periodically calculated when at least one of the wheel speed variation D and at least one of the front and rear wheel speed ratio β are renewed.

Incidentally, in the second to sixth embodiments, the compensation processing of the rotational status value (i.e., the wheel speed variation D) is executed based on the ideal driving status value βid (=F(A)). However, the above-mentioned regression line accuracy evaluating processing can alternatively be adapted for other tire air pressure detection devices that use a compensation methodology disclosed by the related art invention.

While the above description is of the preferred embodiments of the present invention, it should be appreciated that the invention may be modified, altered, or varied without deviating from the scope and fair meaning of the following claims.

What is claimed is:

1. A tire air pressure detection device comprising:
   a vehicle wheel speed detecting portion (2a–2d, 3a) for detecting respective vehicle wheel speeds;
   a rotational status value calculating portion (3b) for calculating a rotational value (D) expressing a relationship of the respective vehicle wheel speeds to cancel a wheel speed variation between left and right wheels generated due to vehicle turns;
   a slip status value calculating portion (3c) for calculating a slip status value (β) based on the vehicle wheel speeds detected by the vehicle wheel speed detecting portion, the slip status value depending on a slip status between driven wheels and non-driven wheels;
   a regression line calculating portion (3d) for calculating a regression line that is a linear function expressing a relationship between the rotational status value calculated by the rotational status value calculating portion and the slip status value calculated by the slip status value calculating portion;
   a rotational status value compensating portion (3f) for compensating for the rotational status value calculated by the rotational status value calculating portion based on the regression line calculated by the regression line calculating portion;
   a tire air pressure decrease detecting portion (3h) for detecting tire air pressure decrease based on the rotational status value compensated for by the rotational status value compensating portion; and
   a warning anticipation timing calculating portion for anticipating a warning timing at which the tire air pressure decrease detecting portion will detect the tire air pressure decrease based on the rotational status value compensated for by the rotational status value compensating portion;

wherein the tire air pressure decrease detecting portion detects that tire air pressure decreases when a clocked determination time reaches the warning anticipation timing anticipated by the warning anticipation timing calculating portion.

2. The tire air pressure detection device according to claim 1, wherein the warning anticipation timing calculating portion calculates a timing when the rotational status compensated for by the rotational status value compensating portion will exceed a predetermined threshold as the warning anticipation timing.

3. The tire air pressure detection device according to claim 2, wherein the warning anticipation timing calculating portion calculates the warning anticipation timing based on a change in value per predetermined interval of the rotational status compensated for by the rotational status value compensating portion.

4. The tire air pressure detection device according to claim 1, further comprising:

a memory portion (3g) for memorizing warning anticipation timing data calculated by the warning anticipation timing calculating portion, wherein the memory portion renews previously stored warning anticipation timing data stored before to new calculated warning anticipation timing data when the new warning anticipation timing data is earlier than the previously stored warning anticipation timing data.

5. The tire air pressure detection device according to claim 1, further comprising:

an ideal driving status calculating portion (3e) for calculating an ideal status value ($\beta$id) corresponding to a slip value when there is no tire slippage;

wherein the rotational status value compensating portion (3f) calculates an ideal rotational status value when there is no tire slippage based on the regression line calculated by the regression line calculating portion and the ideal slip status value calculated by the ideal driving status calculating portion.

6. The tire air pressure detection device according to claim 1, wherein the rotational status value calculating portion calculates a wheel speed variation (D) corresponding to a difference in wheel speed ratios of wheels located diagonally from each other.

7. A tire air pressure detection device comprising:

a vehicle wheel speed detecting portion (2a–2d, 3a) for detecting respective vehicle wheel speeds;

a rotational status value calculating portion (3b) for calculating a rotational value (D) expressing a relationship of the respective vehicle wheel speeds to cancel a wheel speed variation between left and right wheels generated due to vehicle turns;

a slip status value calculating portion (3c) for calculating a slip status value ($\beta$) based on the vehicle wheel speeds detected by the vehicle wheel speed detecting portion, the slip status value depending on a slip status between driven wheels and non-driven wheels;

a regression line calculating portion (3d) for calculating a regression line that is a linear function expressing a relationship between the rotational status value calculated by the rotational status value calculating portion and the slip status value calculated by the slip status value calculating portion;

a rotational status value compensating portion (3f) for compensating for the rotational status value calculated by the rotational status value calculating portion based on the regression line calculated by the regression line calculating portion;

a tire air pressure decrease detecting portion (3h) for detecting tire air pressure decrease based on a determination value ($\Delta D''_{AVE}$) that is defined based on the rotational status value compensated for by the rotational status value compensating portion; and a tread-lift compensation processing portion (3j) for determining whether the determination value exceeds a predetermined threshold (Cth) and compensating for the determination value when the determination value exceeds the predetermined threshold, wherein the tire air pressure decrease detecting portion detects that the tire air pressure decreases based on the determination value calculated by the tread-lift compensation processing portion.

8. A tire air pressure-detection device comprising:

a vehicle wheel speed detecting portion (2a–2d, 3a) for detecting respective vehicle wheel speeds;

a rotational status value calculating portion (3b) for calculating a rotational value (D) expressing a relationship of the respective vehicle wheel speeds to cancel a wheel speed variation between left and right wheels generated due to vehicle turns;

a slip status value calculating portion (3c) for calculating a slip status value ($\beta$) based on the vehicle wheel speeds detected by the vehicle wheel speed detecting portion, the slip status value depending on a slip status between driven wheels and non-driven wheels;

a regression line calculating portion (3d) for calculating a regression line that is a linear function expressing a relationship between the rotational status value calculated by the rotational status value calculating portion and the slip status value calculated by the slip status value calculating portion;

a rotational status value compensating portion (3f) for compensating for the rotational status value calculated by the rotational status value calculating portion based on the regression line calculated by the regression line calculating portion;

a tire air pressure decrease detecting portion (3h) for detecting tire air pressure decrease based on a determination value ($\Delta D''_{AVE}$) that is defined based on the rotational status value compensated for by the rotational status value compensating portion; and a tread-lift compensation processing portion (3j) for executing compensation processing for removing an effect of tread-lift from the determination value and for adjusting a degree of the compensation processing with respect to a scale of the determination value, wherein the tire air pressure decrease detecting portion detects that the tire air pressure decreases based on the determination value compensated by the compensation processing of the tread-lift compensation processing portion.

9. The tire air pressure detection device according to claim 8, wherein the tread-lift compensation processing portion enlarges the degree of the compensation when the scale of the determination value is larger.

10. The tire air pressure detection device according to claim 8, wherein the tread-lift compensation processing portion executes the compensation after an initializing mode at which the post-compensation rotational status value has not yet been calculated by the rotational status value calculating portion.

11. A tire air pressure detection device comprising:
a vehicle wheel speed detecting portion (2a–2d, 3a) for detecting respective vehicle wheel speeds;
a rotational status value calculating portion (3b) for calculating a rotational value (D) expressing a relationship of the respective vehicle wheel speeds to cancel a wheel speed variation between left and right wheels generated due to vehicle turns;
a slip status value calculating portion (3c) for calculating a slip status value (β) based on the vehicle wheel speeds detected by the vehicle wheel speed detecting portion, the slip status value depending on a slip status between driven wheels and non-driven wheels;
a regression line calculating portion (3d) for calculating a regression line that is a linear function expressing a relationship between the rotational status value calculated by the rotational status value calculating portion and the slip status value calculated by the slip status value calculating portion;
a rotational status value compensating portion (3f) for compensating for the rotational status value calculated by the rotational status value calculating portion based on the regression line calculated by the regression line calculating portion;
a tire air pressure decrease detecting portion (3h) for detecting tire air pressure decrease based on a determination value ($\Delta D''_{AVE}$) that is defined based on the rotational status value compensated for by the rotational status value compensating portion; and
a tread-lift compensating processing portion (3j) for executing compensation processing to remove an effect of tread-lift from the determination value and for adjusting a degree of the compensation processing with respect to a scale of the determination value, wherein the compensation is executed after an initializing mode at which the post-compensation rotational status value has not yet been calculated by the rotational status value calculating portion;
wherein the tire air pressure decrease detecting portion detects that tire air pressure decreases based on the determination value calculated by the tread-lift compensation processing portion.

12. The tire air pressure detection device according to claim 11, wherein the tire air pressure decrease detecting portion (3h) detects the tire air pressure decrease based on the determination value ($\Delta D''_{AVE}$) that corresponds to a difference between a post-compensation value calculated at the initializing mode and that calculated after the initializing mode.

13. A tire air pressure detection device comprising:
a vehicle wheel speed detecting portion (2a–2d, 3a) for detecting respective vehicle wheel speeds;
a rotational status value calculating portion (3b) for calculating a rotational value (D) expressing a relationship of the respective vehicle wheel speeds to cancel a wheel speed variation between left and right wheels generated due to vehicle turns;
a first rotational status value compensation portion (3n) for compensating for the rotational status value calculated by the rotational status value calculating portion using vehicle speed as a parameter;
a slip status value calculating portion (3c) for calculating a slip status value (β) based on the vehicle wheel speeds detected by the vehicle wheel speed detecting portion, the slip status value depending on a slip status between driven wheels and non-driven wheels;
a regression line calculating portion (3d) for calculating a regression line that is a linear function expressing a relationship between the rotational status value (D*) compensated for by the first rotational status value compensating portion and the slip status value calculated by the slip status value calculating portion;
a second rotational status value compensating portion (3f) for further compensating for the rotational status value (D*) compensated for by the first rotational status value compensating portion based on the regression line calculated by the regression line calculating portion;
a tire air pressure decrease detecting portion (3h) for detecting tire air pressure decrease based on the rotational status value compensated for by the second rotational status value compensating portion.

14. The tire air pressure detection device according to claim 13, wherein the second rotational status value compensating portion calculates a change in value of rotational status value relative to the vehicle speed based on a relationship between the rotational status value calculated by the rotational status value calculating portion and the vehicle speed, and compensates for the rotational status value by adding the change in value as a compensation value.

15. The tire air pressure detection device according to claim 14, further comprising:
a rotational status value memorizing portion (3b) for memorizing data regarding the rotational status value calculated by the first rotational status value calculating portion,
wherein the first rotational status value calculating portion calculates the relationship between the rotational status value calculated by the rotational status value calculating portion and the vehicle speed based on the data regarding the rotational status value stored in the rotational status value memorizing portion, compensates for the rotational status value based on a predetermined deformation feature when the relationship has not yet been calculated, and compensates for the rotational status value based on the relationship after the relationship has been calculated.

16. The tire air pressure detection device according to claim 13, further comprising:
an ideal driving status calculating portion (3e) for calculating an ideal status value (βid) corresponding to a slip value when there is no tire slippage;
wherein the second rotational status value compensating portion (3f) calculates an ideal rotational status value when there is no tire slippage based on the regression line calculated by the regression line calculating portion and the ideal slip status value calculated by the ideal driving status calculating portion.

17. A tire air pressure detection device comprising:
a vehicle wheel speed detecting portion (2a–2d, 3a) for detecting respective vehicle wheel speeds;
a rotational status value calculating portion (3b) for calculating a rotational value (D) expressing a relationship of the respective vehicle wheel speeds to cancel a wheel speed variation between left and right wheels generated due to vehicle turns;
a slip status value calculating portion (3c) for calculating a slip status value (β) based on the vehicle wheel speeds detected by the vehicle wheel speed detecting portion, the slip status value depending on a slip status between driven wheels and non-driven wheels;

a regression line calculating portion (3*d*) for classifying vehicle speed into several speed ranges, distinguishing the rotational status value and the slip status value for each related speed range of the several speed ranges, and calculating a regression line that is a linear function expressing a relationship between the rotational status value calculated by the rotational status value calculating portion and the slip status value calculated by the slip status value calculating portion at each speed range of the several speed ranges;

a rotational status value compensating portion (3*f*) for compensating for the rotational status value calculated by the rotational status value calculating portion based on the regression line calculated at the each speed range by the regression line calculating portion;

a tire air pressure decrease detecting portion (3*h*) for calculating a regression curve based on the rotational status value of the each speed range compensated for by the rotational status value compensating portion, and detecting tire air pressure decrease based on a determination value ($\Delta D''_{AVE}$) that is defined based on the rotational status value at the each speed ranges compensated for by the rotational status value compensating portion.

18. The tire air pressure detection device according to claim 17, further comprising:

a memory portion (3*n*) or distinguishing and memorizing the data of the rotational status value calculated by the rotational status value calculating portion and the slip status value calculated by the slip status value calculating portion at the each speed range; and a counter for counting each interval since the data has been stored in the memory portion;

wherein the memory portion deletes the data when the interval reaches a predetermined time.

* * * * *